United States Patent
Huang et al.

(10) Patent No.: US 10,465,031 B2
(45) Date of Patent: Nov. 5, 2019

(54) SHORT-CHAIN FLUOROCARBON-GRAFTED ELASTOMER BLOWOUT PREVENTER PACKERS AND SEALS FOR ENHANCED H2S RESISTANCE

(71) Applicant: Hydril USA Distribution LLC, Houston, TX (US)

(72) Inventors: Ming Yu Huang, Houston, TX (US); Yuhua Dong, Houston, TX (US); Read Joseph Johnson, Houston, TX (US); Miao Luo, Potsdam, NY (US); John B. McLaughlin, Norwood, NY (US); Sitaraman Krishnan, Potsdam, NY (US); Zackary Putnam, Potsdam, NY (US)

(73) Assignee: Hydril USA Distribution LLC, Houston, TX (US)

( * ) Notice: Subject to any disclaimer, the term of this patent is extended or adjusted under 35 U.S.C. 154(b) by 33 days.

(21) Appl. No.: 15/342,880

(22) Filed: Nov. 3, 2016

(65) Prior Publication Data
US 2017/0129982 A1    May 11, 2017

Related U.S. Application Data

(60) Provisional application No. 62/252,088, filed on Nov. 6, 2015.

(51) Int. Cl.
*C08F 279/02*    (2006.01)
*E21B 33/06*    (2006.01)
(Continued)

(52) U.S. Cl.
CPC .............. *C08F 279/02* (2013.01); *C08K 3/04* (2013.01); *C08L 9/02* (2013.01); *C08L 15/005* (2013.01);
(Continued)

(58) Field of Classification Search
USPC ................... 251/1.1, 1.2, 1.3, 363
See application file for complete search history.

(56) References Cited

U.S. PATENT DOCUMENTS 2,609,836 A    9/1952    Knox
3,671,607 A    6/1972    Lee
(Continued)

FOREIGN PATENT DOCUMENTS

EP    2138535 A1    12/2009
WO    2015/101598 A1    7/2015

OTHER PUBLICATIONS

Cantu et al., "Enhancement of the Chemical Resistance of Nitrile Rubber by Direct Fluorination", Journal of Applied Polymer Science, vol. No. 89, pp. 971-979, 2003.
(Continued)

*Primary Examiner* — Jessica Cahill
*Assistant Examiner* — Daphne M Barry
(74) *Attorney, Agent, or Firm* — Hogan Lovells US LLP

(57) ABSTRACT

A packer unit to be used in an annular blowout preventer. The packer unit includes an elastomer body including a compound of a nitrile rubber base polymer having a polymer chain, and a quantity of fluorine atoms attached to the polymer chain. The compound includes between 50 and 60% of the nitrile elastomer, between 25 to 35% carbon black, and the rest includes other materials. The quantity of fluorine atoms comprises short-chain fluorocarbon chain molecules The quantity of fluorine atoms displaces at least an equal quantity of hydrogen atoms from the polymer chain when the elastomer body is fluorinated.

23 Claims, 16 Drawing Sheets

(51) Int. Cl.
   *C08K 3/04* (2006.01)
   *C08L 9/02* (2006.01)
   *C08L 15/00* (2006.01)

(52) U.S. Cl.
   CPC ........ *E21B 33/06* (2013.01); *C08K 2201/008* (2013.01)

(56) References Cited

U.S. PATENT DOCUMENTS

| | | | |
|---|---|---|---|
| 3,769,370 A | 10/1973 | Martin et al. | |
| 4,100,225 A * | 7/1978 | Mueller | C08F 291/00 |
| | | | 525/265 |
| 4,900,793 A | 2/1990 | Lagow et al. | |
| 5,100,950 A | 3/1992 | Carlson et al. | |
| 5,141,661 A * | 8/1992 | DeRosa | C08F 8/18 |
| | | | 508/224 |
| 5,214,102 A | 5/1993 | Zielinski et al. | |
| 5,274,049 A | 12/1993 | Zielinski et al. | |
| 7,741,392 B2 | 6/2010 | Nasreddine et al. | |
| 7,754,714 B2 * | 7/2010 | Li | C07D 205/12 |
| | | | 514/235.8 |
| 7,960,454 B2 * | 6/2011 | Waddell | B60C 1/00 |
| | | | 524/53 |
| 8,091,855 B1 * | 1/2012 | Huang | C08K 3/04 |
| | | | 166/85.4 |
| 8,536,277 B2 | 9/2013 | Mueller et al. | |
| 9,016,659 B2 * | 4/2015 | Huang | E21B 33/06 |
| | | | 251/1.1 |
| 2013/0140479 A1 | 6/2013 | Solfronk et al. | |

OTHER PUBLICATIONS

Meunier, "Diffusion Coefficients of Small Gas Molecules in Amorphous Cis-1,4-Polybutadiene Estimated by Molecular Dynamics Simulations", The Journal of Chemical Physics, vol. No. 123, Oct. 5, 2005.

Yeo et al., "A Study on the Characteristics of a Rubber Blend of Fluorocarbon Rubber and Hydrogenated Nitrile Rubber", Journal of Industrial and Engineering Chemistry, vol. No. 19, pp. 1540-1548, Feb. 4, 2013.

International Search Report and Written Opinion issued in connection with corresponding PCT Application No. PCT/US2016/060490 dated Feb. 17, 2017.

\* cited by examiner

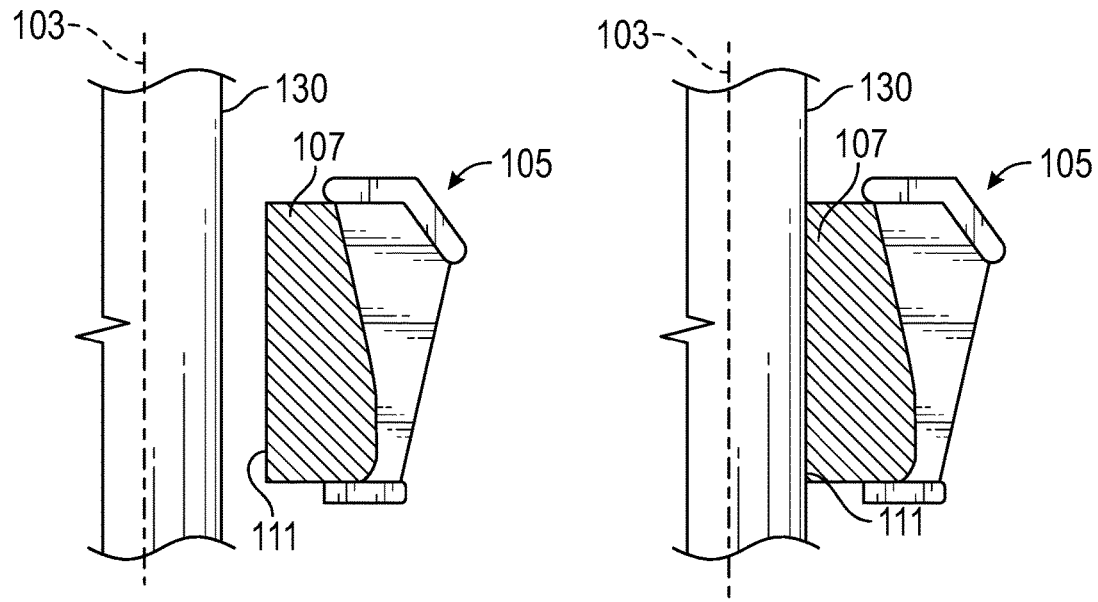
FIG. 2
(Background Art)
FIG. 3
(Background Art)
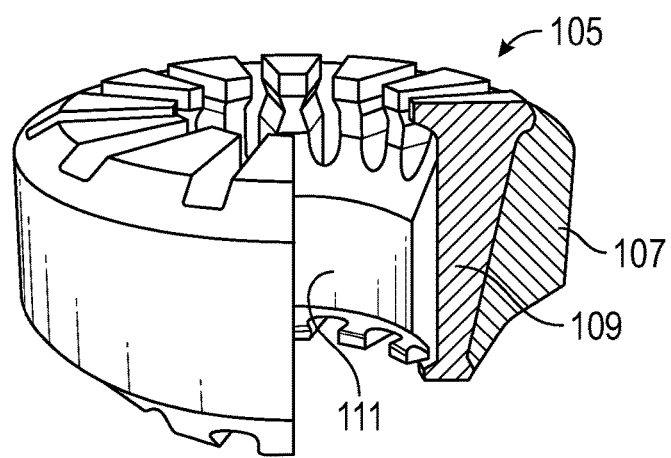
FIG. 4
(Background Art)

SHORT-CHAIN FLUOROCARBON-GRAFTED ELASTOMER BLOWOUT PREVENTER PACKERS AND SEALS FOR ENHANCED H2S RESISTANCE

CROSS REFERENCE TO RELATED APPLICATIONS

This non-provisional patent application claims priority of U.S. Provisional application No. 62/252,088 filed on Nov. 6, 2015, the entire contents of which is incorporated herein by reference.

TECHNICAL FIELD

Embodiments of the subject matter disclosed herein generally relate to methods and systems and, more particularly, to mechanisms and techniques for producing fluorinated elastomeric blowout preventer packers and seals that better withstand harsh environments than existing packers.

BACKGROUND

During the past years, with the increase in price of fossil fuels, the interest in developing new wells has dramatically increased. When drilling a well, for example, in oil and gas exploration applications, safety devices are put in place to prevent injury to personnel and damage to environment and/or equipment resulting from unexpected events associated with the drilling activities. Thus, well control is an important aspect of oil and gas exploration.

Drilling wells in oil and gas exploration involves penetrating a variety of subsurface geologic structures, or "layers." Occasionally, a wellbore will penetrate a layer having a formation pressure substantially higher than the pressure maintained in the wellbore. When this occurs, the well is said to have "taken a kick." The pressure increase associated with the kick is generally produced by an influx of formation fluids (which may be a liquid, a gas, or a combination thereof) into the wellbore. The relatively high pressure kick tends to propagate from a point of entry in the wellbore uphole (from a high pressure region to a low pressure region). If the kick is allowed to reach the surface, drilling fluid, well tools, and other drilling structures may be blown out of the wellbore and the integrity of the well may be destroyed with grave consequences for the environment (e.g., uncontrolled oil spills undersea). These "blowouts" may also result in catastrophic destruction of the drilling equipment (including, for example, the drilling rig) and substantial injury or death of rig personnel.

Because of the risk of blowouts, blowout preventers ("BOPs") are typically installed at the surface or on the sea floor in deep water drilling arrangements to effectively seal a wellbore until active measures can be taken to control the kick. BOPs may be activated so that kicks are adequately controlled and "circulated out" of the system. There are several types of BOPs, one common type of which is an annular blowout preventer.

Annular BOPs typically includes annular, elastomeric "packing units" that may be activated to encapsulate drillpipe and well tools to completely seal about a wellbore. In situations where no drillpipe or well tools are within the bore of the packing unit, the packing unit can be compressed to such an extent that the bore is entirely closed, acting as a valve on the wellbore. Typically, packing units are used in the case of sealing about a drillpipe, in which the packing unit can be quickly compressed, either manually or by machine, to effect a seal about the pipe to prevent a well from blowing out.

An example of an annular BOP having a packing unit is disclosed in U.S. Pat. No. 2,609,836, ("Knox") and incorporated herein by reference in its entirety, the assignee of the present invention. The packing unit includes a plurality of metal inserts embedded in an elastomeric body. Upon compression of the packing unit about a drillpipe, or upon itself, to seal against the wellbore pressure, the elastomeric body is squeezed radially inward, causing the metal inserts to move radially inward as well.

FIG. 1 is an example of a background art annular BOP 101 including a housing 102. The annular BOP 101 has a bore 120 extending therethrough and is disposed about a longitudinal axis 103. A packing unit 105 is disposed within the annular BOP 101 about the longitudinal axis 103. The packing unit 105 includes an elastomeric annular body 107. The packing unit 105 includes a bore 111 concentric with the bore 120 of the BOP 101.

The annular BOP 101 is actuated by fluid pumped into opening 113 of a piston chamber 112. The fluid applies pressure to a piston 117, which moves the piston 117 upward. As the piston 117 moves upward, the piston 117 translates force to the packing unit 105 through a wedge face 118. The force translated to the packing unit 105 from the wedge face 118 is directed upward toward a removable head 119 of the annular BOP 101, and inward toward the longitudinal axis 103 of the annular BOP 101. Because the packing unit 105 is retained against the removable head 119 of the annular BOP 101, the packing unit 105 does not displace upward from the force translated to the packing unit 105 from the piston 117. However, the packing unit 105 does displace inward from the translated force, which compresses the packing unit 105 toward the longitudinal axis 103 of the annular BOP 101. In the event a drill pipe 130 is located along the longitudinal axis 103, with sufficient radial compression, the packing unit 105 will seal about the drill pipe into a "closed position." The open position is shown in FIG. 2 while the closed position is shown in FIG. 3. In the event a drill pipe is not present, the packing unit 105, with sufficient radial compression, will completely seal the bore 111.

An example of the packing unit 105 used in an annular BOP 101 is shown in FIG. 4. As before, the packing unit 105 includes an elastomeric annular body 107 and may include a plurality of metallic inserts 109. The metallic inserts 109 may be distributed at equal radial distances from each other in the elastomeric annular body 107 of the packing unit 105. The packing unit 105 includes the bore 111.

The traditional packing units use for the elastomeric annular body nitrile rubber (NBR), which is the work horse in BOP applications because of its good physical properties and oil resistance. However, NBR exhibits accelerated chemical degradation when exposed to zinc bromide ($ZnBr_2$) fluid, which is a component of the "mud" used in the wells for various purposes. An alternative to NBR is the Fluorocarbon Elastomer (FKM), which has better resistance to chemicals including $ZnBr_2$. However, FKM is not mechanically strong as the NBR and it is also expensive.

Another approach to improve the chemical degradation is to surface fluorinate NBR molded BOP parts. U.S. Pat. Nos. 5,214,102 and 5,274,049 (the contents of which are included by reference in their entirety herein) describe fluorination of molded elastomeric articles for reducing static and dynamic coefficients of friction and improving the wear life of the articles. Specifically, these two documents considered fluorinating elastomers as Kraton, Hytrel and other thermoplastic rubbers (a material that have both elastomeric and thermoplastic properties). Along the same lines, a paper entitled "Enhancement of the Chemical Resistance of Nitrile Rubber by Direct Fluorination" published in the Journal of Applied Polymer Science, Vol. 89, pages 971-979 (2003) (the entire content of which is incorporated in its entirety herein), investigates the addition of a fluorination layer on a nitrile rubber to prevent chemicals from penetrating inside the rubber and observing a retardation of loss of the mechanical properties.

Hydrogen sulfide (H2S) in sour crude oils is a great challenge to elastomer blow out preventer (BOP) packers and seals. Many such packers and seals include nitrile elastomer. H2S, however, degrades typical nitrile elastomer materials. Some known fluoroelastomers have better H2S compatibility, but are much more expensive and mostly are not suitable to BOP applications based on existing compound technology.

However, the NBR with the surface fluorination is still not good enough for the present applications, especially that it was observed that cracks appear in the elastomeric material when the fluorination is performed. Accordingly, it would be desirable to provide systems and methods that avoid the afore-described problems and drawbacks.

SUMMARY OF THE INVENTION

One example embodiment is a packer unit to be used in an annular blowout preventer, the packer unit including an elastomer body including a compound of a nitrile rubber base polymer having a polymer chain, and a quantity of fluorine atoms attached to the polymer chain, wherein the compound includes between 50 and 60% nitrile rubber, between 25 to 35% carbon black, and the rest includes other materials, wherein the quantity of fluorine atoms comprises short-chain fluorocarbon chain molecules. The compound is selected from the group consisting of nitrile butadiene rubber (NBR), hydrogenated nitrile butadiene rubber (HNBR), and carboxylated nitrile butadiene rubber (XNBR). The quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane. The quantity of fluorine atoms displaces at least an equal quantity of hydrogen atoms from the polymer chain. A ratio of the quantity of fluorine atoms to a quantity of carbon atoms of the compound is about 0.10 to 0.18. The other materials include sulfur, antioxidants, plasticizers; process aids, accelerators, and ZnO based compounds. Alternatively, a ratio of the quantity of fluorine atoms to a quantity of carbon atoms of the compound is about 0.18 to 0.36.

Another example embodiment is a annular blowout preventer (BOP) including a housing having a bore extending therethrough about a longitudinal axis, a packing unit disposed within the housing about the longitudinal axis, and a piston configured to move along the longitudinal axis and to squeeze the packing unit towards the longitudinal axis, wherein the packing unit includes, an elastomer body including a compound of a nitrile rubber base polymer having a polymer chain, and a quantity of fluorine atoms attached to the polymer chain, wherein the compound includes between 50 and 60% nitrile rubber, between 25 to 35% carbon black, and the rest includes other materials, wherein the quantity of fluorine atoms comprises short-chain fluorocarbon chain molecules. The compound is selected from the group consisting of nitrile butadiene rubber (NBR), hydrogenated nitrile butadiene rubber (HNBR), and carboxylated nitrile butadiene rubber (XNBR). The quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane. The quantity of fluorine atoms displaces at least an equal quantity of hydrogen atoms from the polymer chain. A ratio of the quantity of fluorine atoms to a quantity of carbon atoms of the compound is about 0.10 to 0.18. The other materials include sulfur, antioxidants, plasticizers; process aids, accelerators, and ZnO based compounds. Alternatively, a ratio of the quantity of fluorine atoms to a quantity of carbon atoms of the compound is about 0.18 to 0.36.

Another example embodiment is a device, such as a packer or a seal, including an elastomer body including a compound of a nitrile rubber base polymer having a polymer chain, and a quantity of fluorine atoms attached to the polymer chain, wherein the compound includes between 50 and 60% nitrile rubber, between 25 to 35% carbon black, and the rest includes other materials, wherein the quantity of fluorine atoms comprises short-chain fluorocarbon chain molecules. The compound is selected from the group consisting of nitrile butadiene rubber (NBR), hydrogenated nitrile butadiene rubber (HNBR), and carboxylated nitrile butadiene rubber (XNBR). The quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane. The quantity of fluorine atoms displaces at least an equal quantity of hydrogen atoms from the polymer chain. A ratio of the quantity of fluorine atoms to a quantity of carbon atoms of the compound is about 0.10 to 0.18. The other materials include sulfur, antioxidants, plasticizers; process aids, accelerators, and ZnO based compounds. Alternatively, a ratio of the quantity of fluorine atoms to a quantity of carbon atoms of the compound is about 0.18 to 0.36.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 is a schematic diagram of a section of a packing unit in an open position in an annular blowout preventer;

FIG. 3 is a schematic diagram of a section of a packing unit in a closed position in an annular blowout preventer;

FIG. 4 is a schematic diagram of a packing unit;

DETAILED DESCRIPTION

Figure 1:
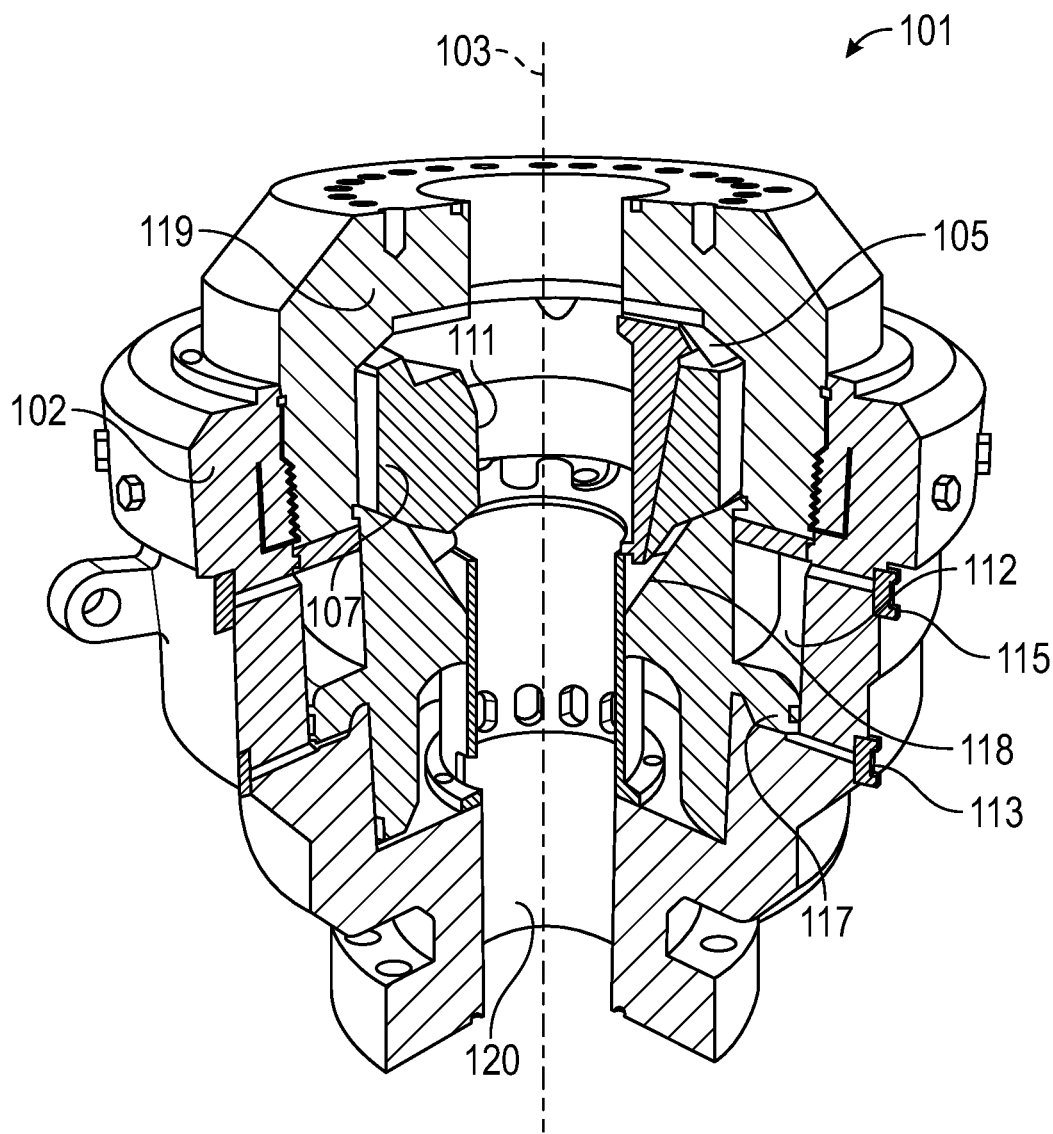
FIG. 1 is a schematic diagram of a conventional annular blowout preventer.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of annular BOP systems. However, the embodiments to be discussed next are not limited to these systems, but may be applied to other systems that require a certain elastomer with predetermined chemical and mechanical characteristics.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to a particular embodiment, various potential materials for making an elastomeric body of a packing unit of an annular BOP system have been surface fluorinated and then tested for chemical and mechanical features. The treated material is compared to a baseline material. The traditional NBR polymeric matrix is used as the baseline material. Also tested is the FKM compound discussed above. Other tested materials are compounds based on the carboxylated nitrile rubber (XNBR) and the hydrogenated nitrile rubber (HNBR).

A brief discussion of the structure of these materials is now provided. NBR is actually a complex family of unsaturated copolymers of acrylonitrile and butadiene. By selecting an elastomer with the appropriate acrylonitrile content in balance with other properties, the rubber compounder can use NBR in a wide variety of application areas requiring oil, fuel, and chemical resistance.

Most NBR manufacturers make at least 20 conventional elastomer variations. NBR producers vary polymerization temperatures to make "hot" and "cold" polymers. Acrylonitrile (ACN) and butadiene (BD) ratios are varied for specific oil and fuel resistance and low temperature requirements. Specialty NBR polymers which contain a third monomer (e.g., divinyl benzene, methacrylic acid) are also offered. Some NBR elastomers are hydrogenated to reduce the chemical reactivity of the polymer backbone, improving heat resistance (e.g., HNBR). Each modification determines uniquely different properties.

Addition of carboxylic acid groups to the NBR polymer's backbone (XNBR) may alter processing and curing properties. The result is a polymer matrix with increased strength, measured by improved tensile, tear, modulus and abrasion resistance. The negative effects include reduction in compression set, water resistance, resilience and some low-temperature properties.

From this description of the NBR, HNBR, and XNBR it is noted that these families include a large number of products having different properties. Thus, finding one or more components that after fluorination exhibit more desirable properties is not obvious or simply.

As zinc bromide brines have been used in some of the drilling muds and completion solutions for increasing fluid densities, the operators of the wells have observed that the traditional nitrile elastomers found in the annular BOPs shows adverse effects to the zinc bromide fluids.

The technology described herein includes a hydrogenated nitrile butadiene rubber (HNBR) elastomer grafted with short-chain fluorocarbon chain molecules, which can be used to enhance the HNBR's resistance to H2S for oil and gas drilling and production applications.

Figure 5:
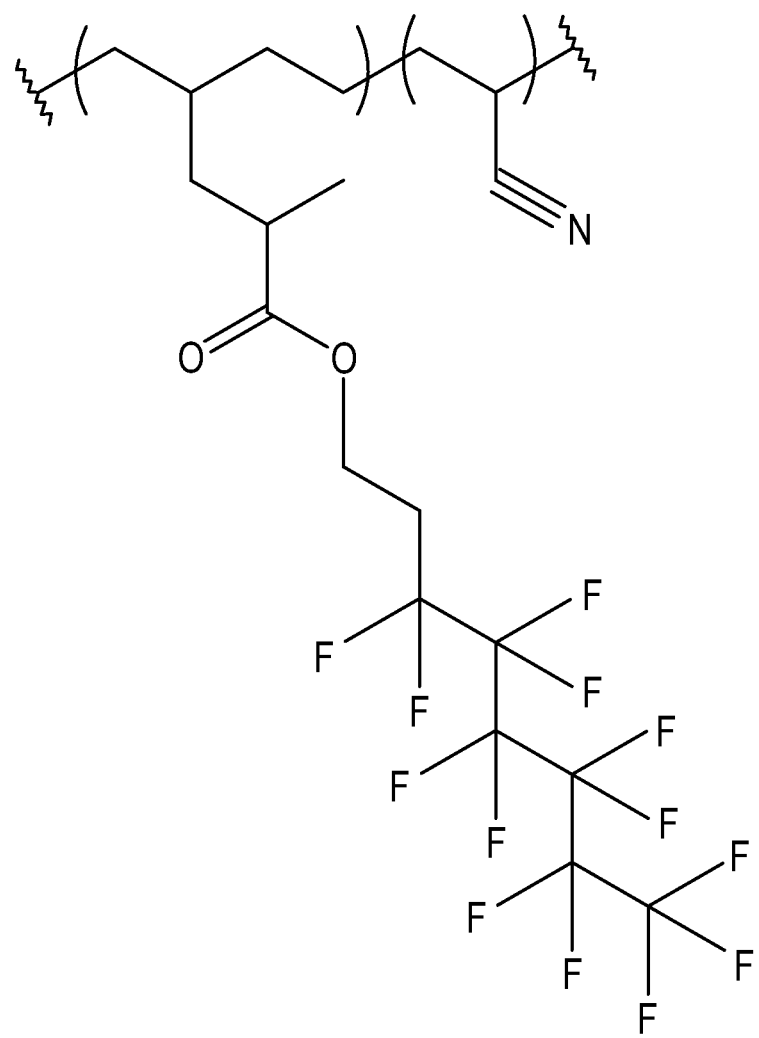
FIG. 5 is an example chemical structure of a short-chain fluorocarbon-grafted HNBR, according to one example embodiment of the present disclosure.

More specifically, the present technology includes using short molecule chains containing fluorine to modify the HNBR macromolecular chains via addition of fluorine-containing grafts to the HNBR polymer chains. Such modification can occur, for example, during mastication of HNBR in the elastomer mixing process. The short-chain fluorocarbon-grafted HNBR elastomer has enhanced H2S resistance, and can thus better serve the oil/gas drilling and production applications, especially where sour crude oil is involved. FIG. 5 is an example chemical structure of a short-chain fluorocarbon-grafted HNBR, according to one example embodiment of the present disclosure.

In addition, an HNBR elastomer with fluorine grafting can have better resistance to corrosive brines, such as, for example, zinc bromide, which can be used in drilling muds and completion fluids, and which degrades typical HNBR without fluorine modification. Molecular dynamic simulations have demonstrated the reduction of the diffusion coefficient number (DCN) of H2S into HNBR with the increase of short-chain fluorocarbon grafts. The lower DCN of H2S into HNBR represents the better resistance of HNBR against H2S. Therefore, adding small amount of short-chain fluorocarbon into a typical HNBR compound can increase the resistance to H2S. Meanwhile, as fluoroelastomers are much more compatible with typical brines, such as zinc bromide, than HNBR, the fluorine-containing short-chain fluorocarbon-grafted HNBR is also expected to have better resistance to the corrosive brines such as zinc bromide.

The efficacy of the technology described herein has been tested. For example, molecular dynamic simulations have been applied to determine diffusivity of H2S into HNBR and short-chain fluorocarbon-grafted HNBR, which demonstrates their H2S compatibility. The lower the H2S diffusivity, the better the H2S compatibility, or the greater the H2S resistance. Simulation results show a dramatic reduction of diffusivities of H2S by short-chain fluorocarbon grafts, which result demonstrates the enhanced H2S compatibility of grafted HNBR. Also, the results show that H2S diffusivity decreases, (i.e., H2S compatibility increases) with the increase of short-chain fluorocarbon concentrations.

Nitrile Elastomers

Nitrile Butadiene Rubber (NBR) elastomers have been widely used in oil and gas industry because of good oil resistance. The acrylonitrile (ACN) group attached to the polymer chains makes NBR elastomers polar in chemistry, and thus prevents their swelling in to most nonpolar hydrocarbon oil/gas. Carboxylated Nitrile Butadiene Rubber (XNBR) elastomer is a derivative of NBR, and includes the addition of carboxylic group which, along with metal oxide, such as zinc oxide or magnesium oxide in vulcanization, can form ionic crosslink that provides enhanced abrasion and wear resistance. HNBR elastomer is another derivative of NBR by partial or whole saturation of carbon-carbon double bonds so that it is more thermal stable than NBR and XNBR. NBR, XNBR, and HNBR are all oil/gas compatible elastomers resulting from the polar acrylonitrile groups, and have been used in oil/gas applications including BOP packers and seals. In most oil/gas applications, however, where sour crude oil is involved, the H2S compatibility of nitrile elastomers (NBR, XNBR or HNBR) can be improved.

Short-Chain Fluorocarbon and Short-Chain Fluorocarbon-Grafted HNBR

To enhance nitrile elastomer's resistance to H2S, the present technology contemplates the introduction of fluorine into nitrile macromolecule chains. A typical method of introducing such fluorine is to graft short-chain fluorocarbon, which is a short fluorine-containing chain, to the nitrile polymer chains. According to the present technology, short-chain fluorocarbon can be used as an additive to a nitrile compound. The short-chain fluorocarbon can be mixed with nitrile elastomers during the mastication step of the mixing process to form short-chain fluorocarbon-grafted nitrile elastomers. This technology can be applied to all short-chain fluorocarbon short fluorine chain products and all nitrile elastomers including NBR, XNBR and HNBR.

For example, a typical short-chain fluorocarbon and a typical nitrile elastomer HNBR (17% acrylonitrile (ACN), 5% unsaturation and 5550 molecular weight (MW)) are used herein for demonstration, as shown in FIG. 5.

Molecular Dynamic Simulations-1, Comparison Between HNBR and Grafted HNBR

Molecular dynamic simulations have been applied to determine diffusivity of H2S into HNBR and grafted HNBR, respectively, which demonstrates the H2S compatibility of each. The lower the H2S diffusivity, the better the H2S compatibility (i.e., the greater the H2S resistance).

The diffusivity is characterized by a diffusion coefficient number. The increase of the mean square displacement (MSD) with time (t) is related to the diffusion coefficient (D) as follows:

$$D = \frac{1}{6N_a} \lim_{t \to \infty} \frac{d}{dt} \sum_{i}^{N_a} \langle [r(t) - r(0)]^2 \rangle$$

where $N_a$ is the number of diffusive atoms in the system.

To determine the diffusion coefficient, a straight line represented by the formula y=a*x+b is fitted to the data in the diffusive regime, and the slope, a, is extracted. The units of a are Å²/ps (where Å represents Angrstrom, and ps represents picoseconds). According to the above definition, D is obtained as follows:

$$D = a/6$$

Figure 6:
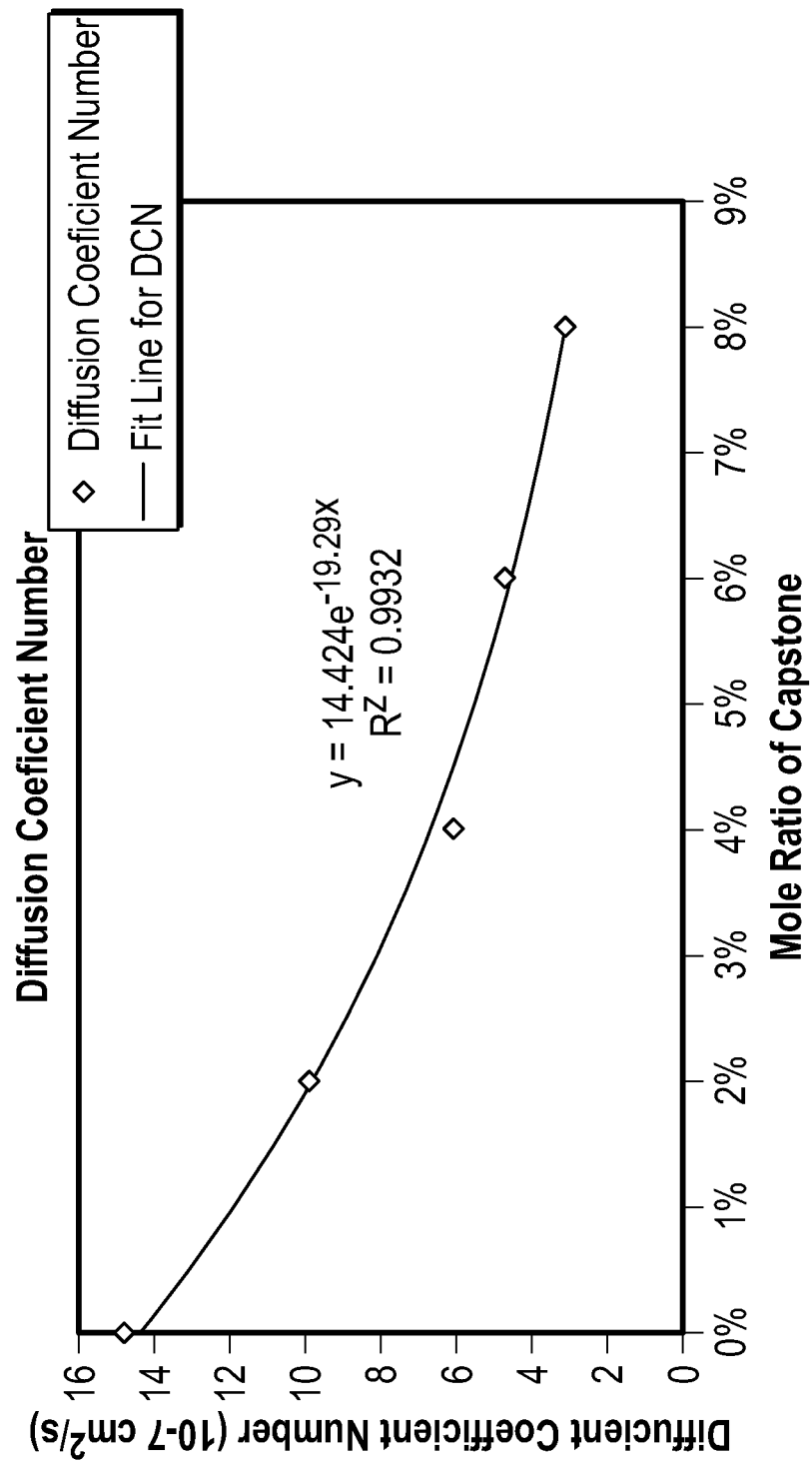
FIG. 6 is a curve showing diffusion coefficient number as a function of mole ratio of short-chain fluorocarbon, according to one example embodiment of the present disclosure.

The simulation results of the diffusivities of H2S with increase temperatures shown in Table 1 for comparisons between HNBR and 10% short-chain fluorocarbon-Grafted HNBR. The data were plotted in FIGS. 6 and 7 for ease of analysis. FIG. 6 is a curve showing diffusion coefficient number as a function of mole ratio of short-chain fluorocarbon, according to one example embodiment of the present disclosure.

TABLE 1

Simulation Results for the Diffusion Coefficient Number of H2S of HNBR and Grafted HNBR (unit of $10^{-4}$ cm²/s)

| | HNBR | Grafted HNBR |
| --- | --- | --- |
| 180 F. | 0.056 | 2.47*10⁻³ |
| 250 F. | 0.156 | 4.45*10⁻³ |
| 350 F. | 0.226 | 0.011 |

Figure 7:
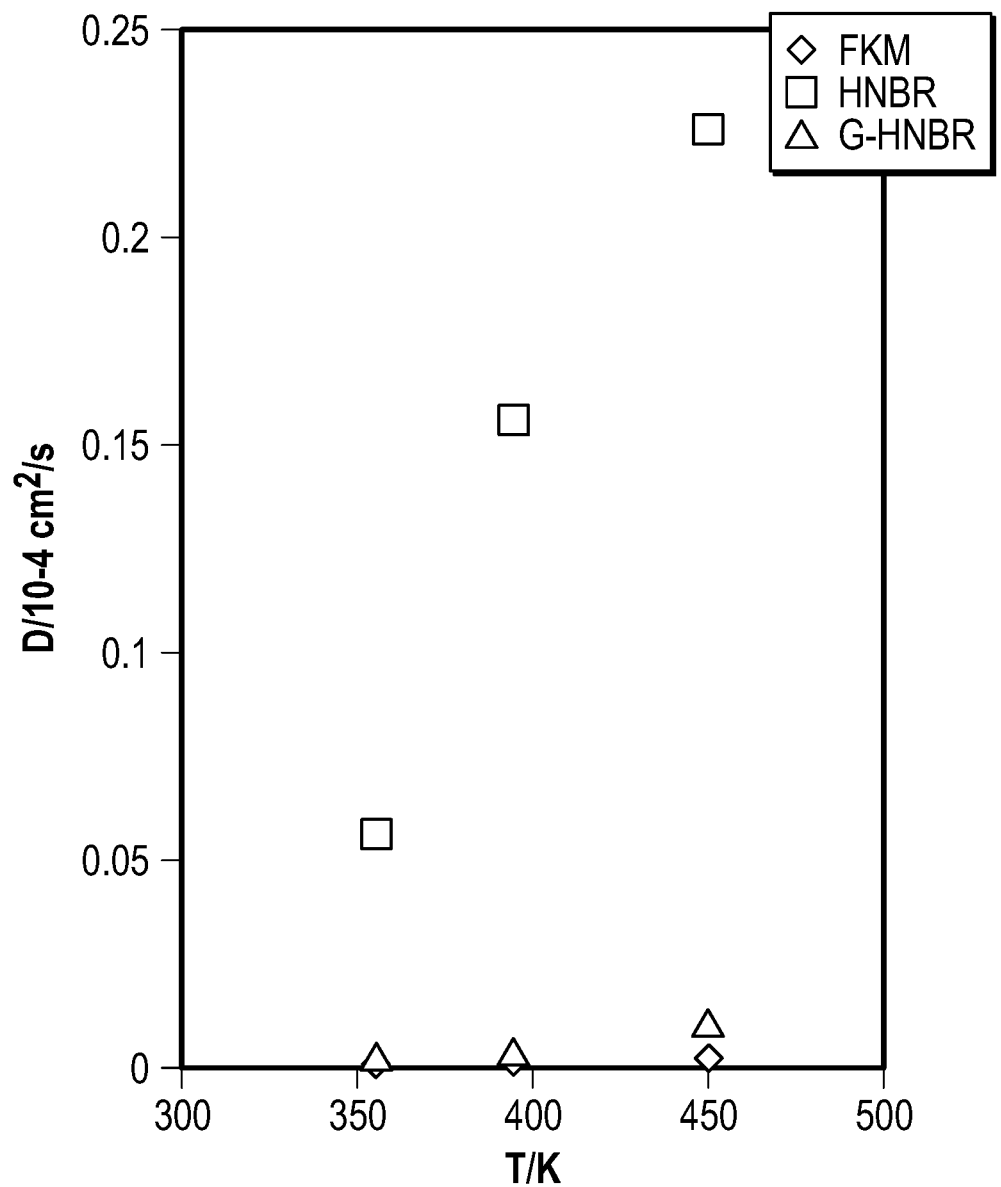
FIG. 7 is a plot showing simulated H2S diffusivities of HNBR and grafted HNBR, according to one example embodiment of the present disclosure.

FIG. 7 is a plot showing simulated H2S diffusivities of HNBR and grafted HNBR, according to one example embodiment of the present disclosure. The simulation results show the dramatic reduction of diffusivities of H2S by short-chain fluorocarbon grafts, which demonstrate the enhanced H2S compatibility of grafted HNBR.

Figure 8:
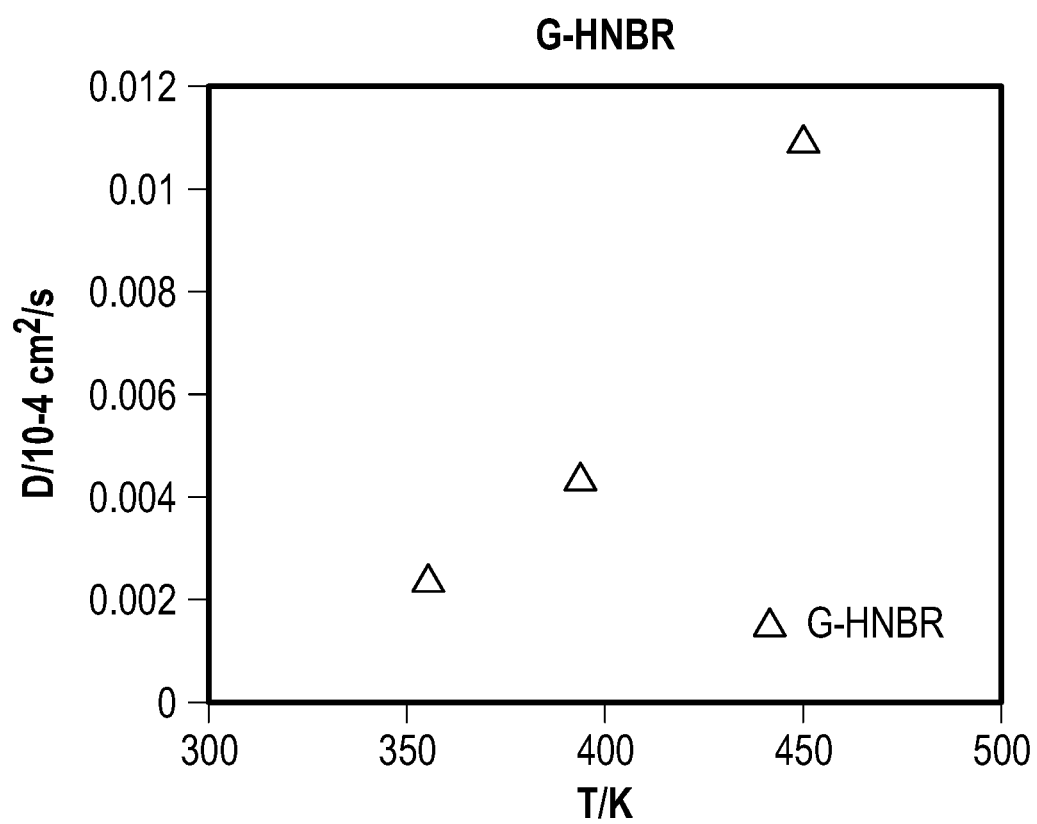
FIG. 8 is a plot showing simulated H2S diffusivities of grafted HNBR with temperature, according to one example embodiment of the present disclosure.

Molecular Dynamic Simulations-2, Variation of Short-Chain Fluorocarbon Concentrations Table 2 shows that the diffusion coefficient number of a short-chain fluorocarbon-grafted HNBR is lower than its non-grafted HNBR counterpart. The diffusion coefficient number decreases with the increase of grafted short-chain fluorocarbon concentration. This indicates that the short-chain fluorocarbon grafting enhances the HNBR's resistance to H2S. FIG. 8 is a plot showing simulated H2S diffusivities of grafted HNBR with temperature, according to one example embodiment of the present disclosure;

TABLE 2

Diffusion Coefficient Number of H2S in Grafted HNBR with variation of Short-chain fluorocarbon Mole Ratio

| Mole ratio of short-chain fluorinated carbon | Diffusion Coefficient Value (cm²/s) |
| --- | --- |
| 0% | 14.8*10⁻⁷ |
| 2% | 9.933*10⁻⁷ |
| 4% | 6.103*10⁻⁷ |
| 6% | 4.704*10⁻⁷ |
| 8% | 3.126*10⁻⁷ |

The technical and commercial advantages of the technology described herein are many. For example, existing nitrile elastomer BOP packers/seals can be modified for use in a high-H2S and/or brine environment with minimum material and processing modification. In addition, the technology can be applied to platforms other than BOPs as well.

H2S (Hydrogen Sulfide), a corrosive component in sour crude oil, degrades typical HNBR (Hydrogenated Nitrile Butadiene Rubber) elastomers used in oil and gas industries. The present invention is to use short molecule chains containing fluorine element typically as Capstone to modify the HNBR macromolecular chains via addition of Capstone's short fluorine-containing grafts to the HNBR polymer chains during mastication of HNBR in the elastomer mixing process. The Capstone grafted HNBR elastomer has enhanced H2S resistance and thus can better serve the oil/gas drilling and production applications especially where sour crude oil is involved. In addition, an HNBR elastomer with fluorine grafting is expected to have better resistance to corrosive brines such as zinc bromide which is used in drilling muds and completion fluids but degrades typical HNBR without fluorine modification. Molecular dynamic simulations have demonstrated the reduction of DCN (Diffusion Coefficient Number) of H2S into HNBR with the increase of Capstone grafts. The lower DCN of H2S into HNBR represents the better resistance of HNBR against H2S. Therefore, adding small amount of Capstone into a typical HNBR compound can increase the resistance to H2S. Meanwhile, as fluoroelastomers are much more compatible with typical brines such as zinc bromide than HNBR, the fluorine-containing Capstone grafted HNBR is expected to have better resistance to the corrosive brines such as zinc bromide.

To enhance nitrile elastomer's resistance to H2S, this invention is to introduce fluorine element into nitrile macromolecule chains. A typical method is to graft Capstone which is short fluorine-containing chain to nitrile polymer chains. Capstone is DuPont's trademarked chemical product of short-chain fluorinated carbons. It has been used mainly as repellent and surfactant. The present invention is to use Capstone as an additive to a nitrite compound. The Capstone can be mixed with nitrile elastomers during the mastication step of the mixing process and thus to form capstone grafted nitrile elastomers. This invention can be applied to all Capstone short fluorine chain products and all nitrite elastomers including NBR, XNBR and HNBR. A typical Capstone 62-MA and a typical nitrile elastomer HNBR (17% ACN, 5% unsaturation and 5550 MW) are used herein for demonstration.

H2S in sour crude oils is a great challenge to elastomer BOP packers and seals. Nitrile elastomer is the working horse in drilling and production applications but H2S degrades typical nitrile elastomer materials. Some fluoroelastomers have better H2S compatibility but are much more expensive and mostly are not suitable to BOP applications based on existing compound technology. Using short-chain fluorocarbon as a small quantity additive that is mixed into the nitrile elastomer compounds is not a major change in terms of formulation and mixing process, and it doesn't require any significant change in BOP designs or molding process, but it does greatly increase resistance to H2S. Therefore, this technology could provide a great improvement in nitrite elastomer BOP packers and seals in terms of H2S and brine compatibility, only requiring a small change in formulation and mixing process.

The technical and commercial advantages are that with this invention, our existing nitrile elastomer BOP packers/seals can re-raking for H2S and brine environment with minimum material and processing modification. The cost would only be affected slightly yet the market could be significantly expanded to tough sour crude oil applications.

The invention can be applied to the platforms other than BOPs as well. This application uses a typical Capstone 62-MA and a typical HNBR (17% CAN, 5% unsaturation and 5550 Molecular Weight) to demonstrate the present invention. However, this invention can be applied to all nitrile elastomers including NBR (Nitrile Butadiene Rubber), XNBR (Carboxylated Nitrile Butadiene Rubber), and HNBR. Molecular dynamic simulations are applied to determine diffusivity of H2S into HNBR and Grafted HNBR, which demonstrates their H2S compatibility. The lower the H2S diffusivity, the better the H2S compatibility or the greater the H2S resistance. The simulation results show the dramatic reduction of diffusivities of H2S by capstone grafts, which demonstrates the enhanced 1-12S compatibility of grafted HNBR. Also, the H2S diffusivity decreases or the H2S compatibility increases with the increase of Capstone concentration. Prior solution has seen using fluorine containing chemicals to coat the HNBR or other nitrile elastomer survace to enhance their chemical resistance. This invention is to mix fluorine-containing Capstone into a nitrile (typical HNBR) compound during mixing and graft the elastomer macromolecule chains with short Capstone chains. Capstone is a is a partially fluorinated methacrylate monomer, derived from a linear 6,2-telomer alcohol. The chemical name for Capstone is 2-Methyl-2-propenoic acid, 3,3,4,4,5,5,6,6,7,7,8,8-tridecafluorooctyl ester, and the chemical formula for Capstone is $C_{12}H_9F_{13}O_2$. The atomic structure for Capstone can be illustrated as follows:

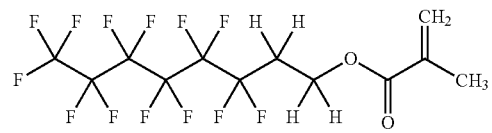 [SMILES: C=C(C)C(=O)OCCC(F)(F)C(F)(F)C(F)(F)C(F)(F)C(F)(F)C(F)(F)F]

Other materials having molecular structures similar to that of Capstone may also be used. Fluorolink, which is a dihydroxypropanoxymethy derivative of perfluoropolyoxyalkane, sold by Solvay or Fombin Z-DOL 4000, which is a dihydroxy derivative of perfluoropolyoxyalkane, which is also sold by Solvay, are just a few examples.

The method may include introducing fluorine element into nitrile elastomer macromolecules to enhance H2S and Brine resistance, mix short-chain fluorocarbon with nitrile elastomer during mixing and the short-F-chains are grafted into elastomers. Can be applied to over 90% of our BOP compounds without a major change. Only small amount (2-8%) of fluorocarbon needed. Chemical reaction during mixing, no extra processing. Existing nitrile BOP packers/seals can re-ranking for H2S and brine compatibility The prior art teaches surface fluorinate a molded nitrile BOP packer or seal in a fluorine gas chamber. Only surface layer is fluorinated. The present invention is to mix short-chain fluorocarbon into nitrile in the rubber plant mixing process and the whole body of a packer or seal is fluorinated. However, the present invention is applicable to all elastomer components made in HHP (Humble Rubber Plant) if H2S or Brine ranking is necessary.

One example embodiment is a packer unit to be used in an annular blowout preventer, the packer unit including an elastomer body including a compound of a nitrile rubber base polymer having a polymer chain, and a quantity of fluorine atoms attached to the polymer chain, wherein the compound includes between 50 and 60% nitrile rubber, between 25 to 35% carbon black, and the rest includes other materials, wherein the quantity of fluorine atoms comprises short-chain fluorocarbon chain molecules. The compound is selected from the group consisting of nitrile butadiene rubber (NBR), hydrogenated nitrile butadiene rubber (HNBR), and carboxylated nitrile butadiene rubber (XNBR). The quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane. The quantity of fluorine atoms displaces at least an equal quantity of hydrogen atoms from the polymer chain. A ratio of the quantity of fluorine atoms to a quantity of carbon atoms of the compound is about 0.10 to 0.18. The other materials include sulfur, antioxidants, plasticizers; process aids, accelerators, and ZnO based compounds. Alternatively, a ratio of the quantity of fluorine atoms to a quantity of carbon atoms of the compound is about 0.18 to 0.36.

Another example embodiment is an annular blowout preventer (BOP) including a housing having a bore extending therethrough about a longitudinal axis, a packing unit disposed within the housing about the longitudinal axis, and a piston configured to move along the longitudinal axis and to squeeze the packing unit towards the longitudinal axis, wherein the packing unit includes, an elastomer body including a compound of a nitrile rubber base polymer having a polymer chain, and a quantity of fluorine atoms attached to the polymer chain, wherein the compound includes between 50 and 60% nitrile rubber, between 25 to 35% carbon black, and the rest includes other materials, wherein the quantity of fluorine atoms comprises short-chain fluorocarbon chain molecules. The compound is selected from the group consisting of nitrile butadiene rubber (NBR), hydrogenated nitrile butadiene rubber (HNBR), and carboxylated nitrile butadiene rubber (XNBR). The quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane. The quantity of fluorine atoms displaces at least an equal quantity of hydrogen atoms from the polymer chain. A ratio of the quantity of fluorine atoms to a quantity of carbon atoms of the compound is about 0.10 to 0.18. The other materials include sulfur, antioxidants, plasticizers; process aids, accelerators, and ZnO based compounds. Alternatively, a ratio of the quantity of fluorine atoms to a quantity of carbon atoms of the compound is about 0.18 to 0.36.

Another example embodiment is a device, such as a packer or a seal, including an elastomer body including a compound of a nitrile rubber base polymer having a polymer chain, and a quantity of fluorine atoms attached to the polymer chain, wherein the compound includes between 50 and 60% nitrile rubber, between 25 to 35% carbon black, and the rest includes other materials, wherein the quantity of fluorine atoms comprises short-chain fluorocarbon chain molecules. The compound is selected from the group consisting of nitrile butadiene rubber (NBR), hydrogenated nitrile butadiene rubber (HNBR), and carboxylated nitrile butadiene rubber (XNBR). The quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane. The quantity of fluorine atoms displaces at least an equal quantity of hydrogen atoms from the polymer chain. A ratio of the quantity of fluorine atoms to a quantity of carbon atoms of the compound is about 0.10 to 0.18. The other materials include sulfur, antioxidants, plasticizers; process aids, accelerators, and ZnO based compounds. Alternatively, a ratio of the quantity of fluorine atoms to a quantity of carbon atoms of the compound is about 0.18 to 0.36.

According to an exemplary embodiment, the quantity of fluorine atoms that attach to the polymer chain displace at least an equal quantity of hydrogen atoms (that are attached to the chain prior to the fluorination) from the polymer chain when the elastomer body is fluorinated. However, the quantity of fluorine atoms may be higher as double bonds between carbon atoms of the chain may be broken during fluorination and the fluorine atoms may attach to these carbon atoms without removing corresponding hydrogen atoms. Although this application has been discussed with regard to a packer unit, it is noted that the fluorinated CP-X compound may be used in other devices used in the oil and gas industry, e.g., top seal, diaphragm, ram BOP, etc.

Example I

Rubber H2S Resistance

The dual model (Theodorou & Suter, 1986) is applied to describe the relationship between gas concentration and gas partial pressure in polymer matrix, which is the so called dual sorption and diffusion mechanism:

$$C = K_D p + C_H \frac{bp}{1+bp}$$

where C is the concentration of the gas inside the polymer matrix, p is the partial pressure of the gas, $C_H$ is the concentration of the saturated gas, $K_D$ is the Henry's Law constant, and b is related to the ability of the gas to adsorb on the polymer.

The equation contains two different mechanisms of gas sorption. The first term is Henry's law and the second term is the Langmuir adsorption mechanism at low temperatures.

To obtain the solubility coefficient number of a gas, a series of Grand Canonical Monte Carlo Simulations (GCMC) are performed for different pressures and a fixed temperature. Then, the solubility coefficient number is obtained by:

$$S = \lim_{p \to 0} \frac{C}{P} = K_D + C_H b$$

After obtaining the diffusion coefficient and the solubility coefficient, the permeability coefficient is obtained by:

$$P = DS$$

As D is a dynamic property of that depends on both the gas and polymer matrix and S is a temperature dependent property of the gas and polymer matrix, the permeability coefficient could be applied to evaluate the difficulty of gas passing through the polymer matrix The GCMC simulations were performed to calculate the solubility coefficient of H2S in polymer matrix. The sorption versus pressure curve is obtained by the sorption module of Materials Studio from 5 kPa to 100 kPa with Metropolis Sampling. 100,000 steps were performed to ensure equilibration and the subsequent production run is performed for 1,000,000 steps.

The GCMC simulation and molecular dynamic simulations results are shown below:

TABLE 3

H2S permeability in 17% ACN content HNBR

| 17% ACN HNBR with Capstone | $D(10^{-10}$ $m^2/s)$ | S (mol/ (mol*Kpa)) | $P(10^{-10}$ $m^2$ *mol/ (s*mol*KPa)) |
|---|---|---|---|
| 0.00% | 2.21 | 0.0103 | 0.0228 |
| 2.00% | 1.61 | 0.0081 | 0.0130 |
| 4.00% | 1.29 | 0.0083 | 0.0107 |
| 6.00% | 0.96 | 0.0077 | 0.0074 |

TABLE 4

H2S permeability in 36% ACN content HNBR

| 36% ACN HNBR with Capstone | $D(10^{-10}$ $m^2/s)$ | S (mol/ (mol*Kpa)) | $P(10^{-10}$ $m^2$ *mol/ (s*mol*KPa)) |
|---|---|---|---|
| 0.00% | 1.6 | 0.012 | 0.0192 |
| 2.00% | 1.12 | 0.0091 | 0.0102 |
| 4.00% | 0.99 | 0.0092 | 0.00911 |
| 6.00% | 0.53 | 0.0087 | 0.00461 |

The solubility of hydrogen sulfide decreases slightly with the increase of the ACN content of the HNBR, but the diffusion coefficient decreases when the ACN content of the HNBR is increased. Combined these two results, the permeability decreases with the increase of ACN content of the HNBR.

Grafting capstone chains to the backbone of HNBR will decrease the solubility, diffusion coefficient, and the permeability.

Example II

Grafting Procedure

Captsone MS-62 was added to HNBR latex, and thermal grafting was carried out after drying the latex. Zeon Chemical HNBR latex containing ~40 wt % polymer was used for the production. Tert-butyl hydroperoxide (TBHP) 70 wt % solution in water was used as an initiator at 10 phr. No filler was added to any of the recipes. Latex films of approximately 2-2.5 mm in thickness were produced using varying amounts of Capstone for grafting purposes (0, 5, 10, and 15 phr). TBHP and Capstone were first added to 5 g of water and emulsified for 15 minutes using a high shear mixer. This emulsion was then added to a beaker containing 25 g of the HNBR latex. Once combined, the mixture was stirred for a further 15 minutes using a magnetic stir bar. After this time, foam produced from mixing was skimmed off and the solution poured in a glass petri dish for drying. The latex—Capstone blend was dried overnight at 60° C. in a convection oven, to remove water. The dried film was cured the following day at 150° C. for 4 hours at ambient pressure.

Mechanical Characterization

Instron tensile testing on small specimens was performed on all blends. An unfilled, cured HNBR sample, prepared by the conventional procedure of internal mixing and two-roll milling, was used as reference, and this sample is marked as "GE UF."

Tensile testing was performed in air at ambient temperature and pressure, at a constant extension rate of 50 mm/min. Samples were tested until failure. Two specimens were tested for a given recipe. Ultimate tensile strength and elongation at break (strain at failure) are tabulated for each sample in the results section.

Differential scanning calorimetry (DSC) was performed to determine the glass transition temperatures of the HNBR-Capstone blends. The DSC temperature scan was performed over a temperature range of −80 to 200° C., at a rate of 20° C./min under nitrogen gas flow rate of xx cm$^3$/min. Two cycles of heating and cooling were conducted, and data reported are based on the second heating cycle.

Instron™ Tensile Testing

Figure 9:
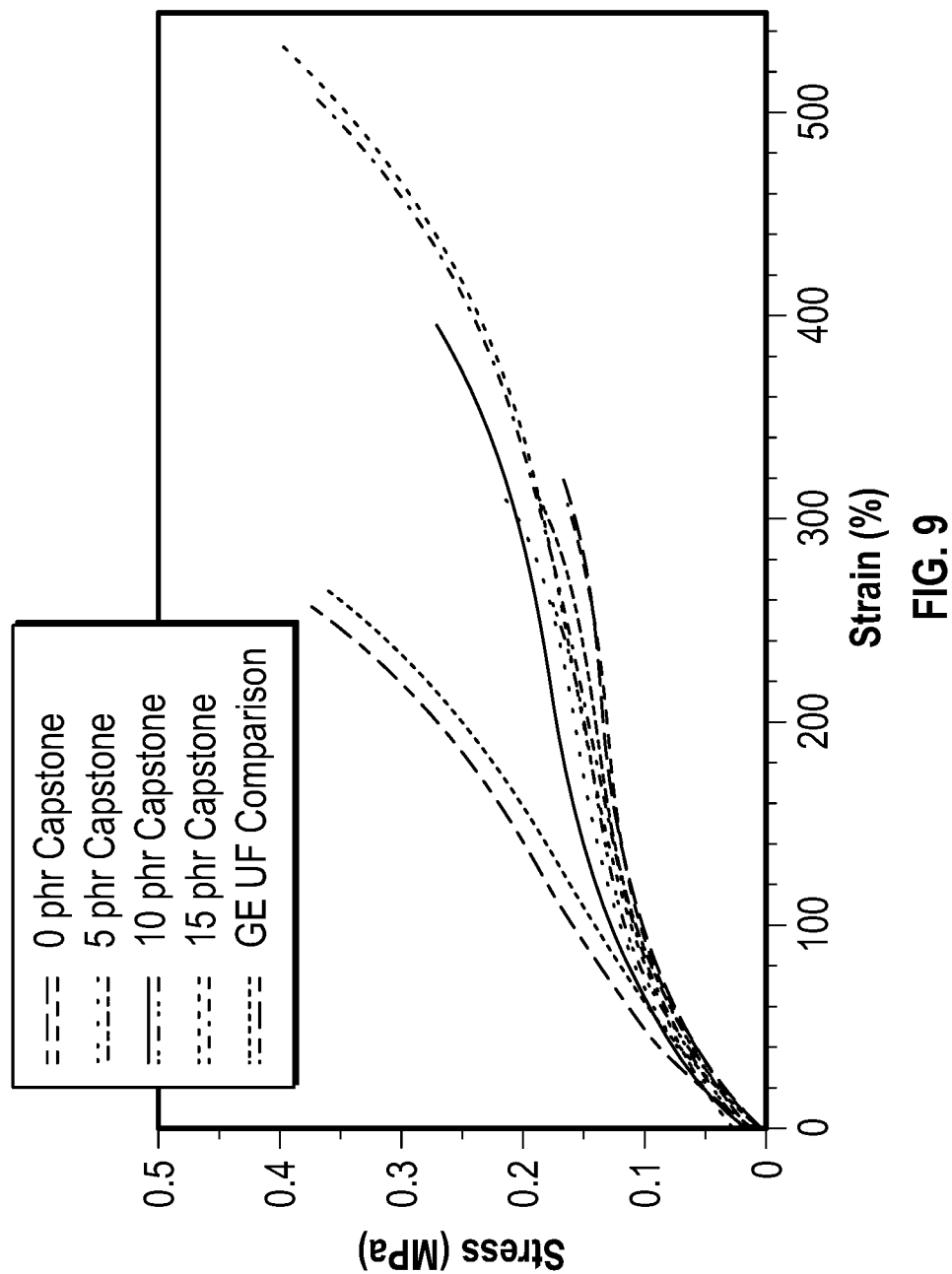
FIG. 9 is a plot showing stress vs. strain curves obtained from an Instron tensile tesing, according to one example embodiment of the present disclosure.

FIG. 9 shows the stress versus strain data for samples containing different concentrations of grafted Capstone. There was no significant difference in the stress vs. strain plots for the HNBR elastomer prepared using the conventional approach and the HNBR elastomer prepared using the latex blending approach until a strain of about 50%. However, at higher strain, the latex-based pure HNBR and Capstone-grafted elastomers had lower stiffness compared with the reference sample.

Grafting with Captsone increased the elongation at break. Samples containing 15 phr of Capstone showed significant improved in ultimate tensile strength and elongation at break. Numerical values of ultimate tensile strength and strain at failure are given in Table 5. FIG. 9 is a plot showing stress vs. strain curves obtained from an Instron tensile tesing, according to one example embodiment of the present disclosure;

TABLE 5

Ultimate strength and strain at failure based on Instron tensile testing of Capstone-grafted HNBR samples; measurements are at ambient temperature and pressure in air.

| | 0 phr Test 1 | 0 phr Test 2 | 5 phr Test 1 | 5 phr Test 2 | 10 phr Test 1 | 10 phr Test 2 | 15 phr Test 1 | 15 phr Test 2 | GE UF Test 1 | GE UF Test 2 |
|---|---|---|---|---|---|---|---|---|---|---|
| Ultimate Tensile Strength (MPa) | 0.164 | 0.157 | 0.182 | 0.192 | 0.257 | 0.176 | 0.371 | 0.397 | 0.353 | 0.371 |
| Strain at Failure (%) | 319 | 308 | 302 | 310 | 397 | 262 | 507 | 535 | 264 | 258 |

The plasticization effect of Capstone is clearly seen. In addition, it is important to remember that the "GE UF" HNBR sample contains a small amount of clay filler, from the Vulcup initiator, which is used for curing the sample. In the Vulcup initiator, the initiator is loaded on clay. The amount of clay, from the Vulcup initiator, in unfilled HNBR is about 5 phr. In contrast, the HNBR elastomer prepared from latex do not contain any clay filler, which could be the reason why these samples are less stiff than unfilled HNBR.

Differential Scanning Calorimetry (DSC)

Table 6 below shows the glass transition temperatures of the Capstone-grafted HNBR samples.

Figure 10:
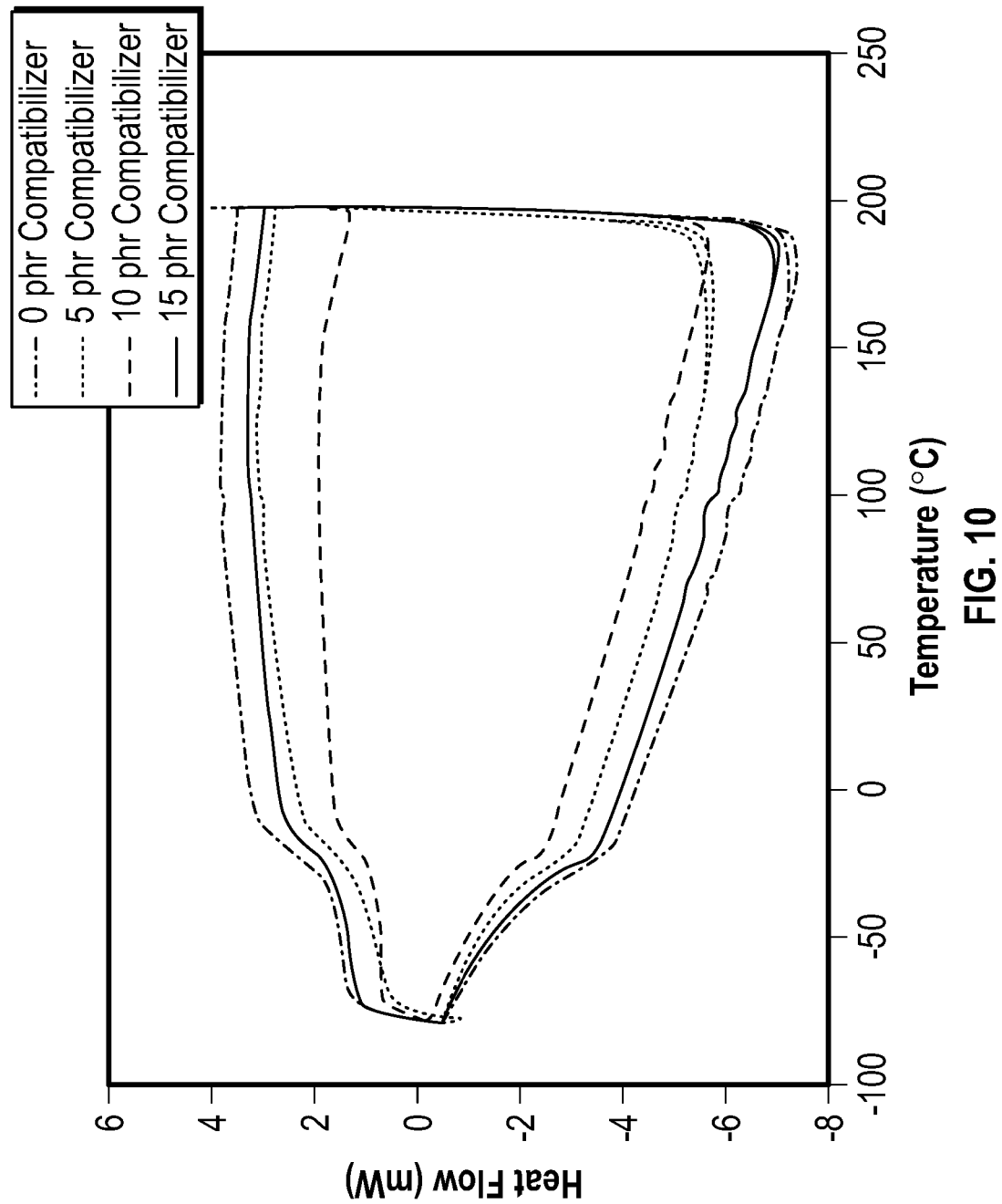
FIG. 10 is a plot showing DSC scans of 0-15 phr Capstone HNBR samples, according to one example embodiment of the present disclosure.

From the results shown in Table 6, it appears that the concentration of Capstone has no effect on the $T_g$ of the films. This is unexpected, because Instron tensile testing clearly showed a plasticization effect of Capstone, based on which the $T_g$ would be expected to decrease with an increase in the concentration of Capstone. FIG. 10 is a plot showing DSC scans of 0-15 phr Capstone HNBR samples, according to one example embodiment of the present disclosure;

Note that these values were obtained using the instruments analysis software. Further analysis is currently being performed to verify the results obtained from the software.

TABLE 6

Glass transition temperatures of Capstone-grafted HNBR.

| Sample | Tg |
| --- | --- |
| 0 phr Capstone | −19.82 |
| 5 phr Capstone | −19.38 |
| 10 phr Capstone | −19.83 |
| 15 phr Capstone | −19.38 |

More important, however, is our observation that the thermal scans of all of the samples exhibited only one glass transition, suggesting that all Capstone present in the film was in the grafted form. If Capstone homopolymer was present in the film, it would be expected to show a different glass transition from the HNBR polymer in the DSC thermogram.

Additional films are being created so that they may be H2S tested. Further work is also being performed on the DSC analysis so we may have a more accurate analysis of their $T_g$'s. Finally, we will be performing IR analysis on the films in order to analyze the Capstone grafting reaction. The FTIR analysis, combined with the single $T_g$ in DSC measurement, will provide more conclusive evidence of successful grafting of Capstone to the HNBR polymer. Instron testing has also provided evidence that the material could be used in existing recipes without weakening the mechanical properties. Instead, it may in fact enhance potentially stiff materials by providing a degree of plasticity to them.

Example III

Figure 11:
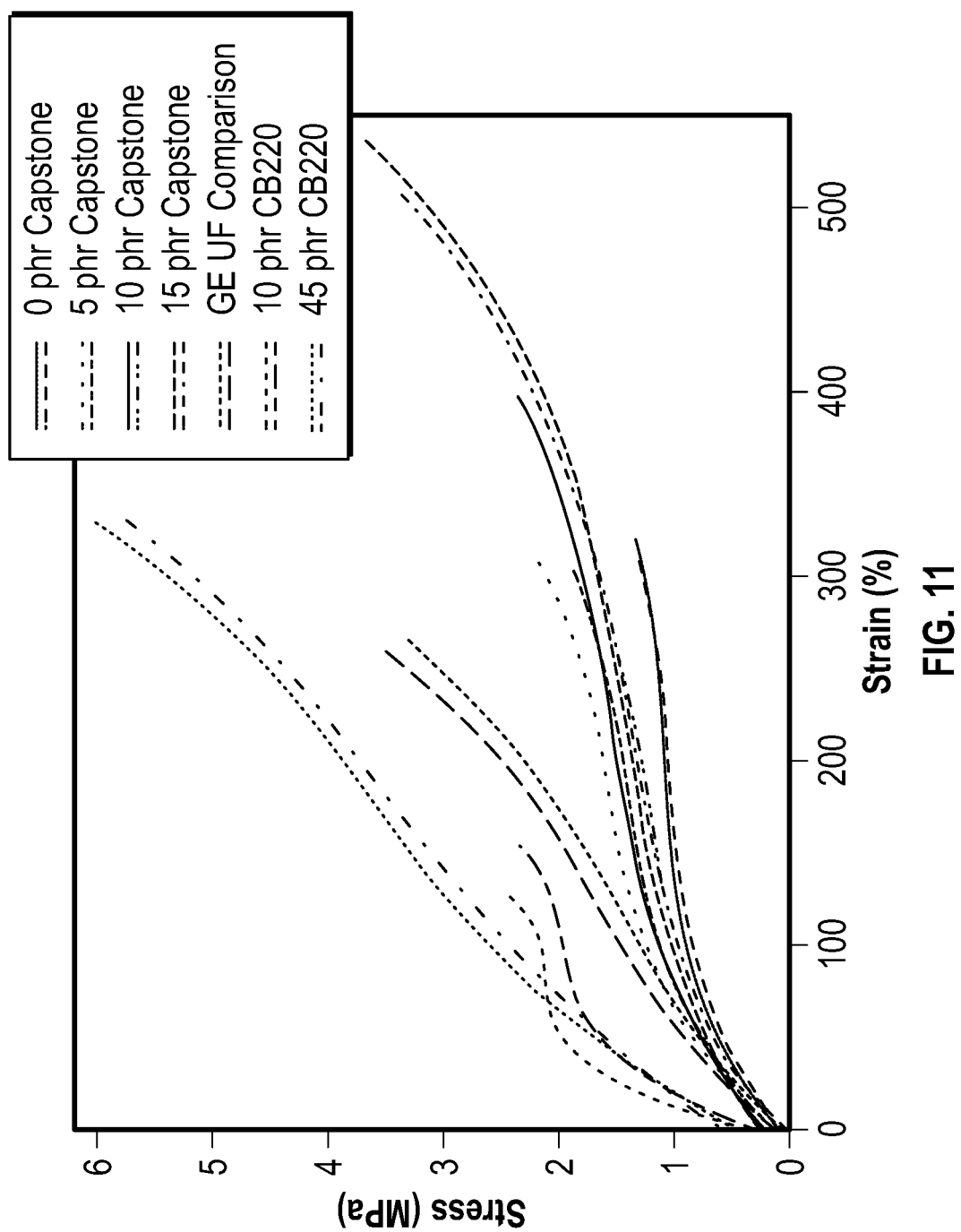
FIG. 11 is a plot showing Instron tensile results including carbon black filled samples, according to one example embodiment of the present disclosure.

Previous reported results indicated the presence of a graft of Capstone 62MA to an HNBR elastomer through mechanical and thermal testing. FIG. 11 is a plot showing Instron tensile results including carbon black filled samples, according to one example embodiment of the present disclosure. FIG. 11 shows a simple tensile test performed on small-scale tensile specimens at a pull rate of 50 mm/min.

As the phr of Capstone is increased, both the elongation at break and the ultimate strength of the material increases. An unfilled sample (note: some samples are cured using clay peroxide and so have some filler) is shown as black and grey lines. At 10 and 15 phr, elongation is greatly increased comparatively and 15 phr Capstone results in a higher ultimate strength as well. Differential scanning calorimetry was also used to provide evidence of the graft's presence.

While there is not a trend among increasing phr of Capstone for the glass transition temperature (Tg), the most important detail in the plot is the presence of only one transition zone, seen around −40 to 0 degrees. If the Capstone were not successfully grafted to the HNBR, it would likely form its own independent phase. This phase would show up in the DSC scan where it would display its own unique transition zone. In addition, it is likely a two phase material would have weak mechanical properties as the stresses become focused on the boundaries between the two phases instead of the polymer chains. Instead we see an increase in mechanical properties as the phr content increases.

Carbon Black Filled Films

Filler was added in the form of carbon black to the system in order to increase the modulus in preparation for H2S testing. Films containing 10 phr and 45 phr of N220 carbon black were produced. The difficulty of dispersing the filler particles in the polymer matrix increases with an increase in the concentration of the filler in the formulation recipe. Particularly with 45 phr samples, much of the filler settles out of the mixture if it is dried too slowly. The results that are displayed below in FIG. 11 were obtained using only the well mixed portion of the sample.

While both sets of samples suffered from filler settling issues, the 45 phr sample exhibited a significant increase in modulus, while maintaining an average elongation at break. Regardless of the problem of settling of the filler particles during the drying step, a noticeable enhancement in the mechanical properties (e.g. elongation at break) was observed compared with the 10 phr elastomer composite. Combined with increasingly more effective mixing techniques, carbon black will be able to provide the higher modulus requested for H2S testing purposes.

Hexane Swelling Study

Figure 12:
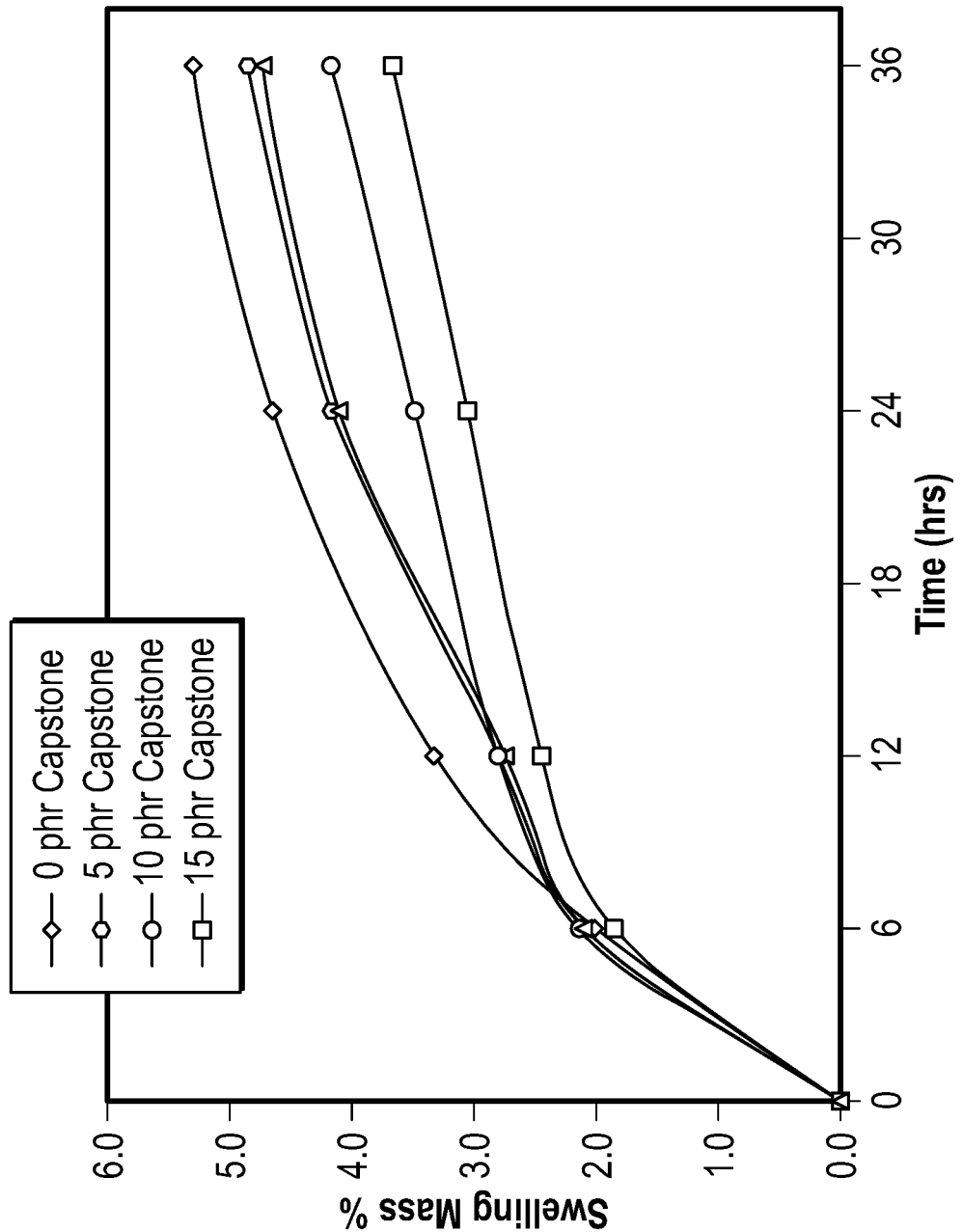
FIG. 12 is a plot showing percentage mass increase over time of different Capstone concentrations, according to one example embodiment of the present disclosure.
Figure 13:
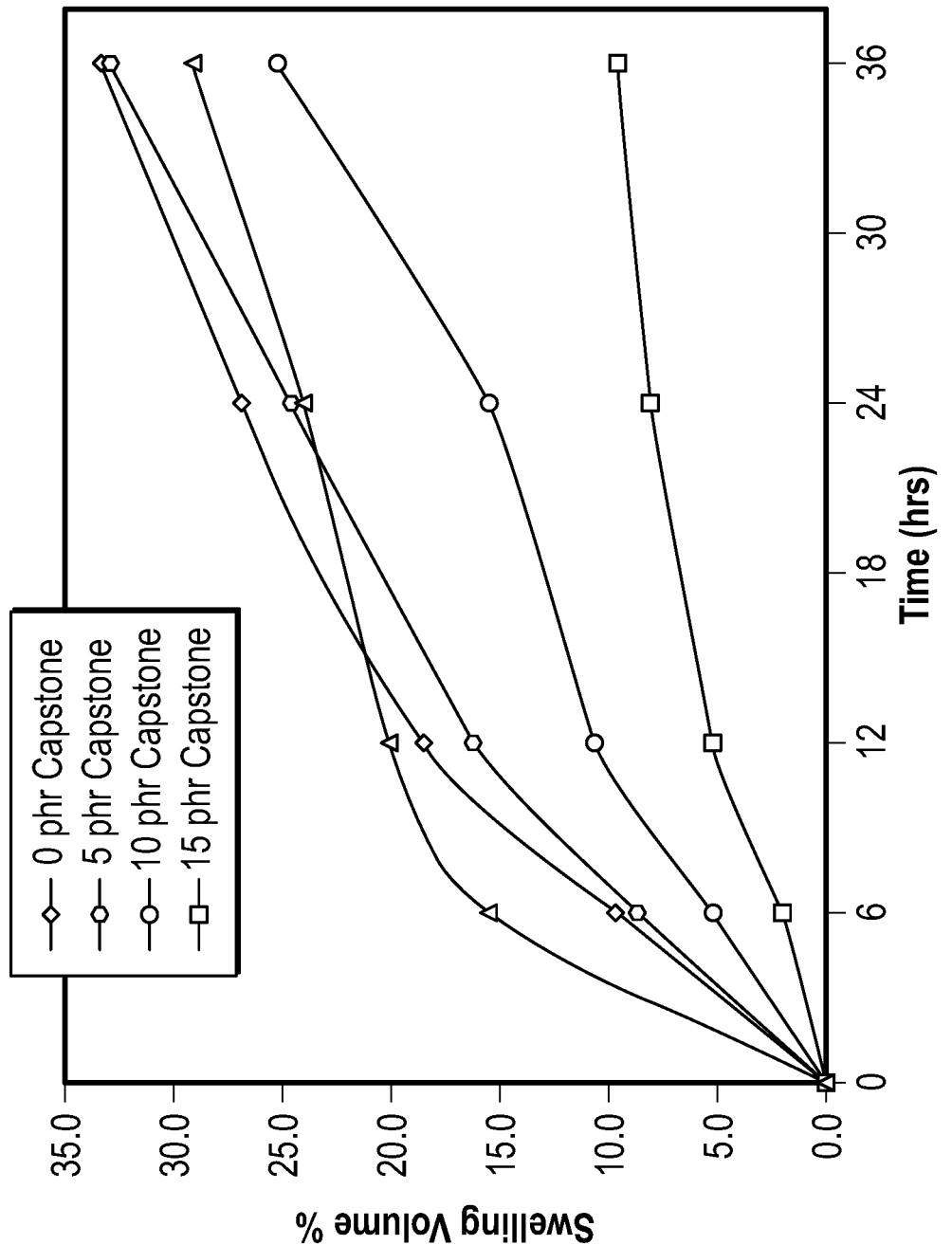
FIG. 13 is a plot showing percentage volume increase over time of different Capstone concentrations, according to one example embodiment of the present disclosure.

In order to provide a level of understanding into how the Capstone is able to resist aggressive chemicals, a swelling study was conducted using hexane. The degree of swelling is characterized in terms of the amount (mass or volume) of the solvent absorbed by unit amount (mass or volume) of the dry elastomer. Half circle samples of roughly even size were exposed to an equivalent amount of hexane. The samples were removed from the solvent every 6 to 12 hours, gently touched on the surface with a lint-free paper, and characterized for increases in mass and volume (diameter and thickness). FIGS. 12 and 13 show the results of this study. FIG. 12 is a plot showing percentage mass increase over time of different Capstone concentrations, according to one example embodiment of the present disclosure.

FIG. 13 is a plot showing percentage volume increase over time of different Capstone concentrations, according to one example embodiment of the present disclosure. A trend emerges where the higher phr content of the Capstone results in greater resistance to swelling. It should be noted however that after many hours this effectiveness deteriorates and the materials begin to swell more rapidly. You can see this beginning to happen to the 10 phr samples at 36 hours.

Thermo Gravimetric Analysis (TGA)

Figure 14:
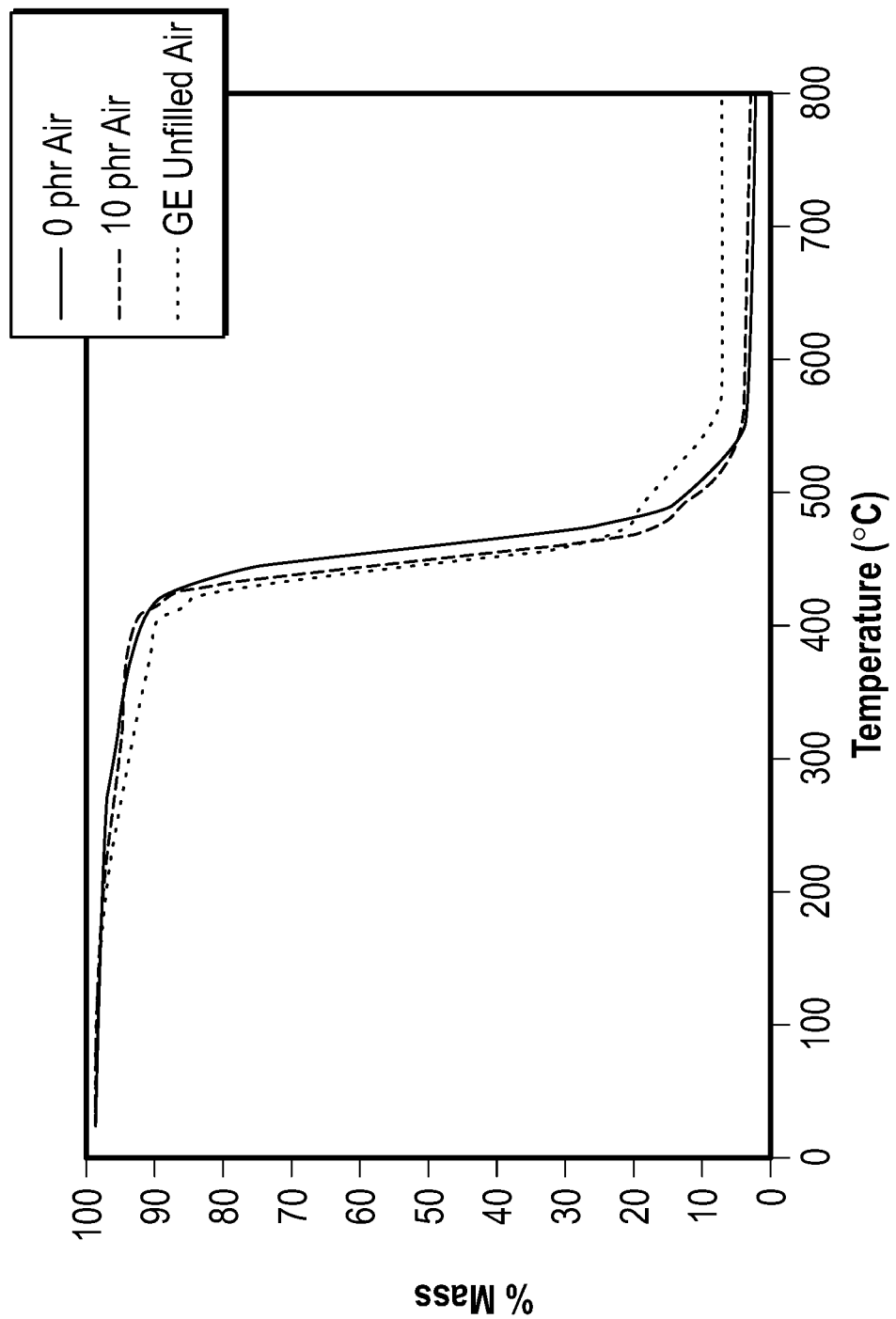
FIG. 14 is a plot showing TGA and mass loss derivative analysis of a plurality of HNBR samples, according to one example embodiment of the present disclosure.
Figure 15:
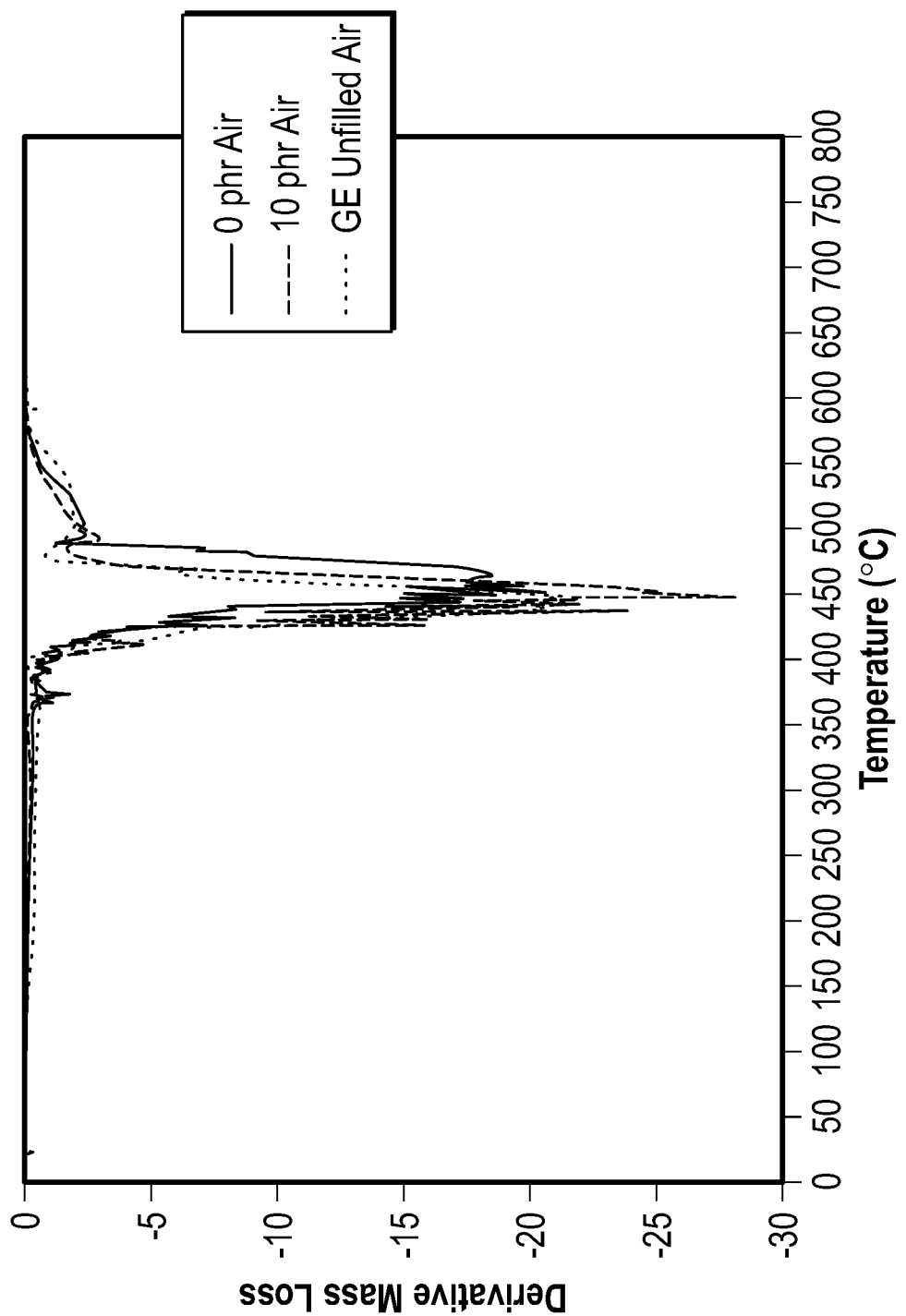
FIG. 15 is a plot showing mass percentage versus temperature graph of different compound concentrations, according to one example embodiment of the present disclosure.

TGA was performed to gain insight into the degradation process of the Capstone samples. The 10 phr, 0 phr, and an unfilled sample were all tested in an air environment from 50 to 800° C. at a ramp rate of 10° C./min. FIG. 14 is a plot showing TGA and mass loss derivative analysis of a plurality of HNBR samples, according to one example embodiment of the present disclosure;

FIG. 15 is a plot showing mass percentage versus temperature graph of different compound concentrations, according to one example embodiment of the present disclosure. Interestingly, there is little observable difference in the TGA curves between the three samples. All the samples exhibited relatively high thermal stability, but onset of mass loss is seen to occur at about 200° C. Under air atmosphere we would expect that the samples would oxidize, and the Capstone would provide a small but noticeable barrier to the process. When the 10 phr TGA was tested under argon atmosphere under the same temperature conditions, the curve looked nearly the same. Because all of the curves behave similarly, we suspect that the films may be oxidized during the curing process. In a later section we discuss the vacuum curing of new samples in order to prevent this early oxidation. But even if oxidation were to occur, it is interesting that it would increase the thermal stability of the elastomer in the TGA measurements.

Attenuated Total Reflectance Fourier Transform Infrared Spectroscopy

Figure 16:
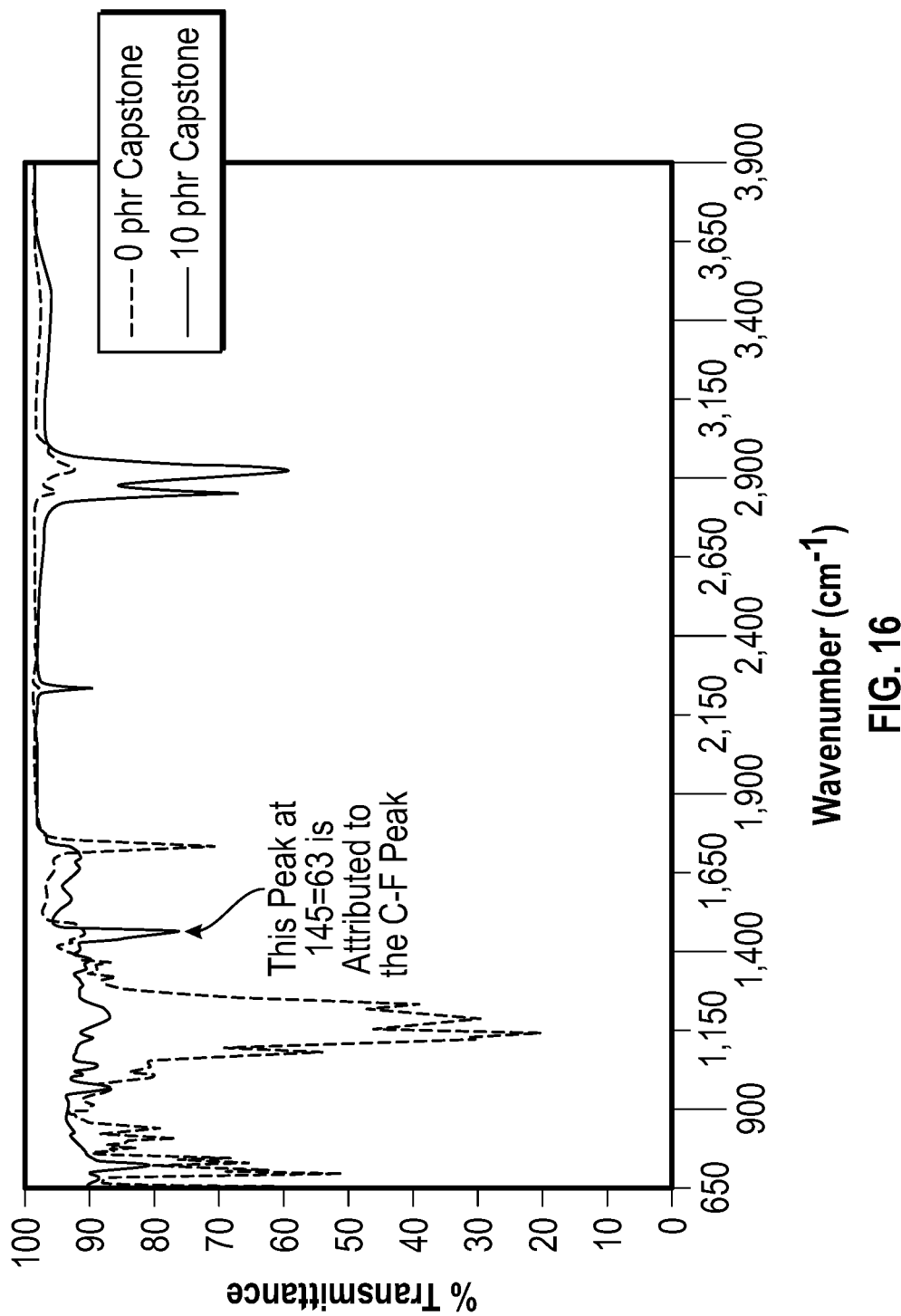
FIG. 16 is a plot showing ATR FTIR transmittance spectra of HNBR samples, according to one example embodiment of the present disclosure.

ATR FTIR was used to try and identify the presence of fluorine in the samples with Capstone and the absence of the 0 phr or other samples. FIG. 16 shows the curves of 0 phr Capstone and 10 phr Capstone. Further testing is required on other samples as well as repeats of the displayed samples. FIG. 16 is a plot showing ATR FTIR transmittance spectra of HNBR samples, according to one example embodiment of the present disclosure; and As shown in FIG. 16, the peak on the 10 phr Capstone spectrum, at 1463 $cm^{-1}$, is from the fluorinated methacrylate monomer, most likely grafted to the HNBR elastomer. Note that from DSC measurements, we have ruled out the presence of free Capstone homopolymer (that is not grafted to HNBR).

Vacuum Cure Study

Figure 17:
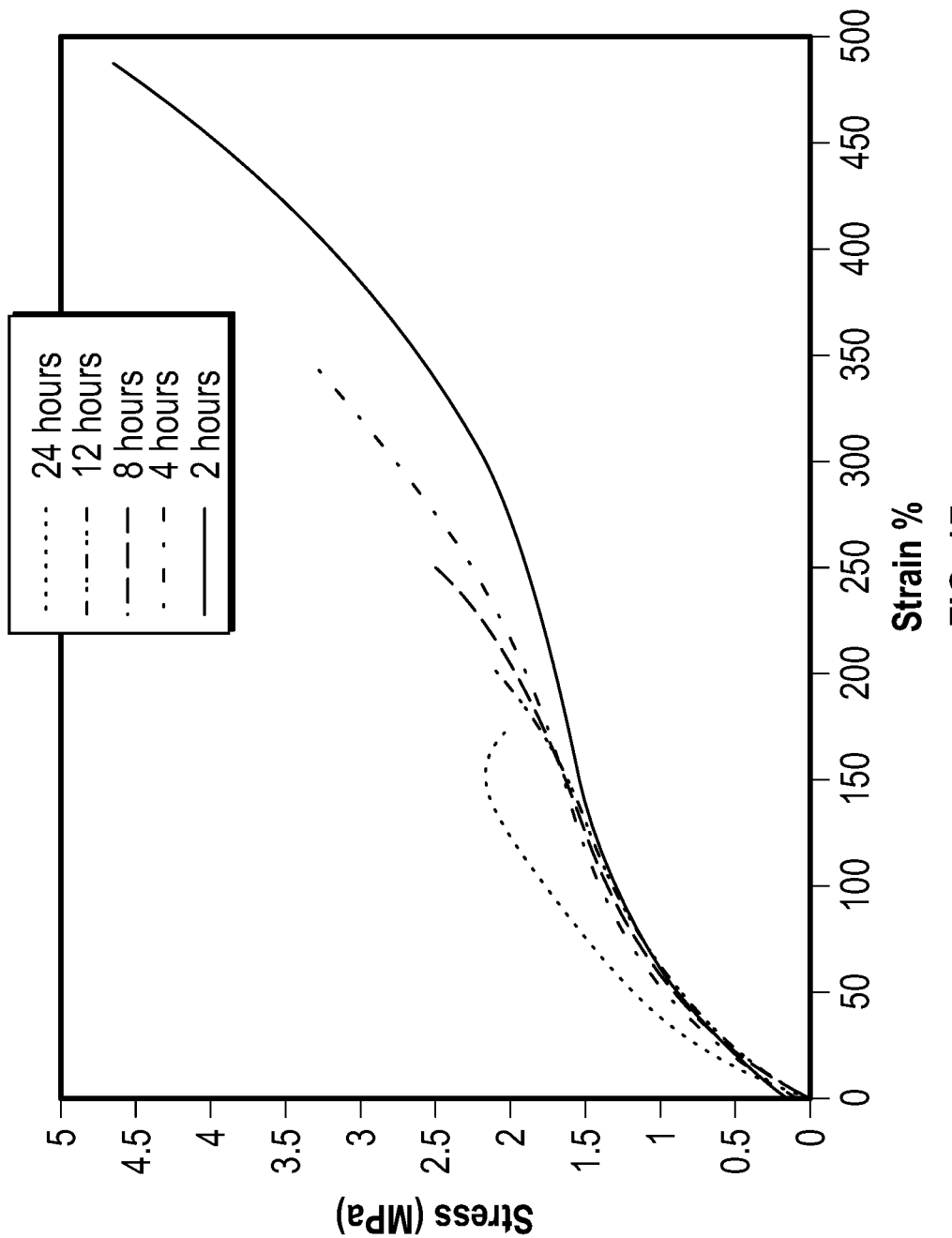
FIG. 17 is a plot showing stress vs. strain curves for vacuum cure, according to one example embodiment of the present disclosure.

FIG. 17 is a plot showing stress vs. strain curves for vacuum cure, according to one example embodiment of the present disclosure. It was suspected that by curing in air atmosphere at 150 C, these Capstone samples were being oxidized, and thus affecting mechanical property and thermal degradation analysis negatively. A cure study was performed under a vacuum environment in order to gain a better understanding of the curing mechanics of the system. A film containing 10 phr Capstone as well as 10 phr tert-butyl hydroperoxide in 70% water for the initiator was cast and dried. Small scale tensile samples were cut prior to curing. Samples were then cured at 2, 4, 8, 12, and 24 hours under vacuum at 150 C. These samples were then testing using the Instron frame. Their stress vs strain curves are shown in FIG. 17, for example.

As the cure time increases beyond 2-4 hours, the mechanical properties quickly begin to degrade. Interestingly, the 2 hour sample surpasses the mechanical properties of the 15 phr sample that was cured in air. From this result, the processing procedure for our films has been altered to allow for even greater increase in mechanical properties.

From the evidence in the vacuum cure study, the 0, 5, 10 and 15 phr Capstone samples will be remade following the new procedure. ATR and TGA, as well as swelling studies may then be able to provide a more accurate analysis the effect that Capstone has on the system. Even with the potential presence of oxidation, the addition on carbon black filler has been a success and innovation into the dispersion process will continue.

The disclosed exemplary embodiments provide a packer unit and a blowout preventer that better resist to chemical degradation than conventional units. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

H2S Test for HNBR with Varied Capstone Grafted

Testing was performed for HNBR in H2S environment. In particular, the H2S aging environment was about 60% diesel, about 5% deionized water, and about 35% gas (including about 10% hydrogen sulfide, about 5% carbon dioxide, and about 85% methane). The H2S aging duration was about 24 hours, and the H2S aging temperature was about 250 degrees Fahrenheit. The change was measured by weighing samples in air and in water. Volume change was measured according to the data in table 7, reproduced below:

TABLE 7

| Experimental Results-Volume Change | | |
|---|---|---|
| Sample Series | Capstone % | Volume Change % |
| 1 | 0 | 65.3 |
| 2 | 2.5 | 76.6 |
| 3 | 5 | 40.7 |
| 4 | 10 | 44 |
| 5 | 15 | 33.6 |

Figure 18:
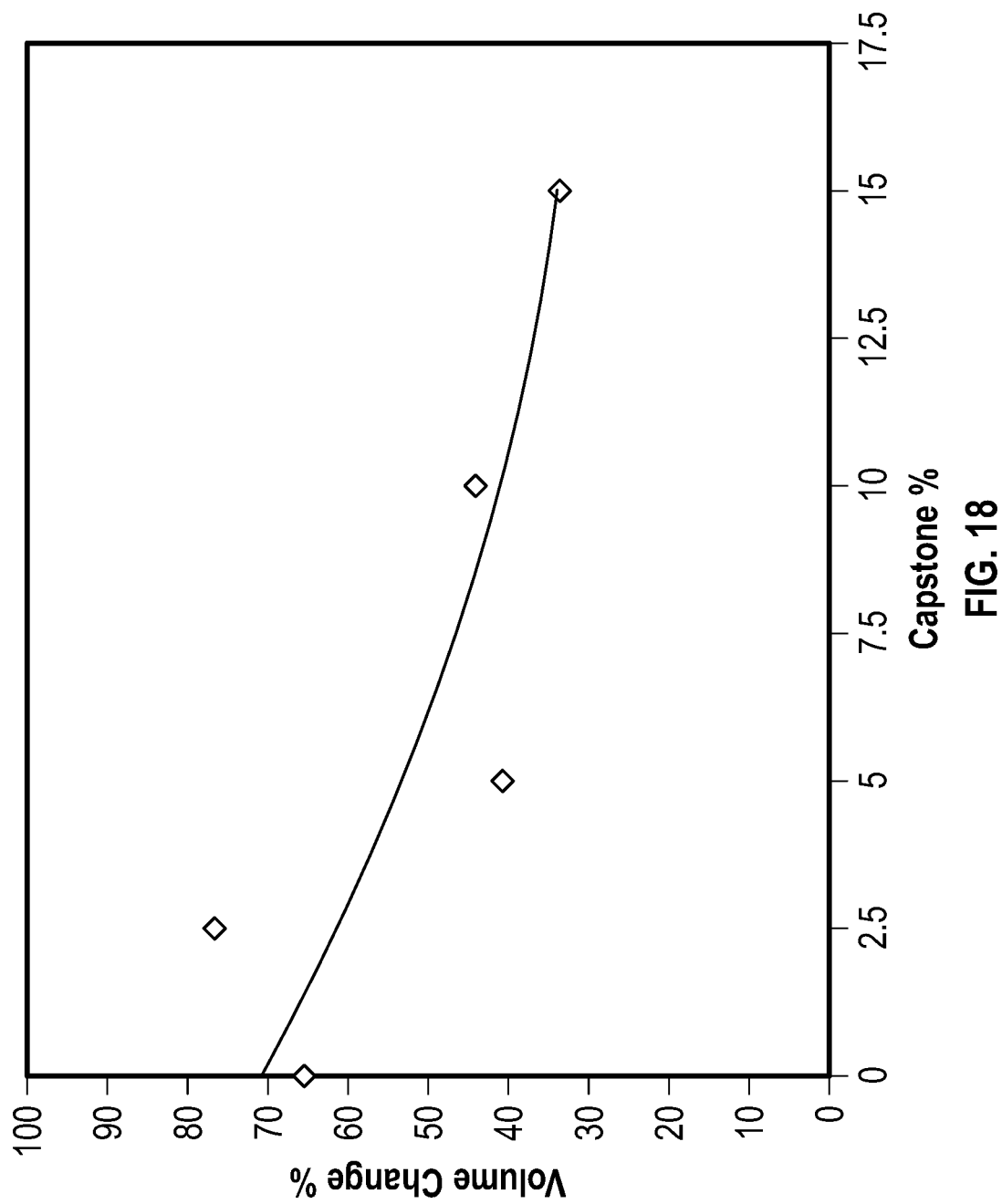
FIG. 18 is a plot showing volume change of a sample vs. a capstone, according to an experimental result of the present invention.

FIG. 18 is a plot showing volume change of a sample vs. a capstone, according to an experimental result of the present technology. As shown, the preliminary H2S aging test on HNBR with varied grafted Capstone demonstrated a trend that with the increase of Capstone graft, the volume change after H2S aging decreases. In other words, Capstone grafts enhance the HNBR's H2S resistance.

The invention claimed is:

1. A packer unit to be used in an annular blowout preventer, the packer unit comprising:
    an elastomer body including a compound of a nitrile rubber base polymer having a polymer chain; and
    a quantity of fluorine atoms grafted into the compound throughout the elastomer body and attached to the polymer chain, wherein the compound includes between 50 and 60% nitrile rubber, between 25 to 35% carbon black, and the rest includes other materials.

2. The packer unit of claim 1, wherein the compound is selected from the group consisting of nitrile butadiene rubber (NBR), hydrogenated nitrile butadiene rubber (HNBR), and carboxylated nitrile butadiene rubber (XNBR).

3. The packer unit of claim 1, wherein the quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane.

4. The packer unit of claim 1, wherein the quantity of fluorine atoms displaces at least an equal quantity of hydrogen atoms from the polymer chain.

5. The packer unit of claim 1, wherein a ratio of the quantity of fluorine atoms to a quantity of carbon atoms of the compound is about 0.10 to 0.18.

6. The packer unit of claim 1, wherein the other materials include sulfur, antioxidants, plasticizers; process aids, accelerators, and ZnO based compounds.

7. The packer unit of claim 1, wherein a ratio of the quantity of fluorine atoms to a quantity of carbon atoms of the compound is about 0.18 to 0.36.

8. The packer unit of claim 1, wherein the quantity of fluorine atoms comprises short-chain flourocarbon chain molecules.

9. An annular blowout preventer (BOP) comprising:
a housing having a bore extending therethrough about a longitudinal axis;
a packing unit disposed within the housing about the longitudinal axis; and
a piston configured to move along the longitudinal axis and to squeeze the packing unit towards the longitudinal axis,
wherein the packing unit includes, an elastomer body including a compound of a nitrile rubber base polymer having a polymer chain, and a quantity of fluorine atoms grafted into the compound throughout the elastomer body and attached to the polymer chain, wherein the compound includes between 50 and 60% nitrile rubber, between 25 to 35% carbon black, and the rest includes other materials.

10. The BOP of claim 9, wherein the compound is selected from the group consisting of nitrile butadiene rubber (NBR), hydrogenated nitrile butadiene rubber (HNBR), and carboxylated nitrile butadiene rubber (XNBR).

11. The BOP of claim 9, wherein the quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane.

12. The BOP of claim 9, wherein the quantity of fluorine atoms displaces at least an equal quantity of hydrogen atoms from the polymer chain.

13. The BOP of claim 9, wherein a ratio of the quantity of fluorine atoms to a quantity of carbon atoms of the compound is about 0.10 to 0.18.

14. The BOP of claim 9, wherein the other materials include sulfur, antioxidants, plasticizers; process aids, accelerators, and ZnO based compounds.

15. The BOP of claim 9, wherein a ratio of the quantity of fluorine atoms to a quantity of carbon atoms of the compound is about 0.18 to 0.36.

16. The BOP of claim 9, wherein the quantity of fluorine atoms comprises short-chain flourocarbon chain molecules.

17. A device comprising:
an elastomer body including a compound of a nitrile rubber base polymer having a polymer chain; and
a quantity of fluorine atoms grafted into the compound throughout the elastomer body and attached to the polymer chain, wherein the compound includes between 50 and 60% nitrile rubber, between 25 to 35% carbon black, and the rest includes other materials.

18. The device of claim 17, wherein the compound is selected from the group consisting of nitrile butadiene rubber (NBR), hydrogenated nitrile butadiene rubber (HNBR), and carboxylated nitrile butadiene rubber (XNBR).

19. The device of claim 17, wherein the quantity of fluorine atoms are selected from the group consisting of a partially fluorinated methacrylate monomer derived from a linear 6,2-telomer alcohol, a dihydroxypropanoxymethy derivative of perfluoropolyoxyalkane, a dihydroxy derivative of perfluoropolyoxyalkane.

20. The device of claim 17, wherein the quantity of fluorine atoms displaces at least an equal quantity of hydrogen atoms from the polymer chain.

21. The device of claim 17, wherein a ratio of the quantity of fluorine atoms to a quantity of carbon atoms of the compound is about 0.10 to 0.18.

22. The device of claim 17, wherein a ratio of the quantity of fluorine atoms to a quantity of carbon atoms of the compound is about 0.18 to 0.36.

23. The device of claim 17, wherein the quantity of fluorine atoms comprises short-chain flourocarbon chain molecules.

* * * * *